United States Patent
Mulligan, IV

(10) Patent No.: US 10,219,229 B1
(45) Date of Patent: Feb. 26, 2019

(54) TRANSMIT POWER LEVEL DETERMINATION FOR COMMUNICATION BETWEEN AN EXTERNAL TRANSCEIVER AND AN IMPLANTABLE TRANSCEIVER

(71) Applicant: NeuroPace, Inc., Mountain View, CA (US)

(72) Inventor: Patrick Gerard Mulligan, IV, Belmont, CA (US)

(73) Assignee: NeuroPace, Inc., Mountain View, CA (US)

( * ) Notice: Subject to any disclaimer, the term of this patent is extended or adjusted under 35 U.S.C. 154(b) by 0 days.

(21) Appl. No.: 15/678,054

(22) Filed: Aug. 15, 2017

(51) Int. Cl.
| | |
|---|---|
| H04W 52/36 | (2009.01) |
| H04W 72/04 | (2009.01) |
| H04W 92/18 | (2009.01) |
| H04Q 9/00 | (2006.01) |
| H04W 84/18 | (2009.01) |

(52) U.S. Cl.
CPC ..... H04W 52/367 (2013.01); H04W 72/0473 (2013.01); H04Q 9/00 (2013.01); H04W 84/18 (2013.01); H04W 92/18 (2013.01)

(58) Field of Classification Search
CPC ............................ H04W 28/04; H04W 52/367
USPC .......... 455/522, 69, 452.1, 452.2, 509, 67.11
See application file for complete search history.

(56) References Cited

U.S. PATENT DOCUMENTS

| | | | |
|---|---|---|---|
| 5,476,488 A | 12/1995 | Morgan et al. | |
| 5,606,725 A | 2/1997 | Hart | |
| 6,298,242 B1 | 10/2001 | Schiff | |
| 7,406,349 B2 | 7/2008 | Seeberger et al. | |
| 7,539,541 B2 | 5/2009 | Quiles et al. | |
| 7,613,521 B2 | 11/2009 | Mass et al. | |
| 9,162,068 B2 | 10/2015 | Dronov | |
| 2007/0060132 A1* | 3/2007 | Wilhelmsson | H04W 52/325 455/445 |
| 2008/0294219 A1 | 11/2008 | Osypka et al. | |
| 2014/0036715 A1* | 2/2014 | Chung | H04W 24/06 370/252 |
| 2016/0181856 A1* | 6/2016 | Lee | H02J 17/00 320/108 |

OTHER PUBLICATIONS

Chevillat et al. "Dynamic rate and transmit power adjustment in IEEE 802.11 wireless LANs." Int'l J. Wireless Information Networks, vol. 12:3, 23 pp. (Jul. 2005).

* cited by examiner

Primary Examiner — John J Lee
(74) Attorney, Agent, or Firm — Loza & Loza, LLP; David S. Sarisky

(57) ABSTRACT

The power level at which signals are transmitted from an external communication interface to an implanted communication interface through a communications link is periodically adjusted. A range of power levels bounded by a minimum transmit power level and a maximum transmit power level is determined. A preferred transmit power level is selected from within the range of power levels, and is used by the external communication interface to transmit signals to the implanted communication interface. Each of the minimum transmit power level and the maximum transmit power level is determined by intentionally causing a reception error to occur at the implanted communication interface, and then making further power level adjustments until a final minimum transmit power level and final maximum transmit power level are obtained.

29 Claims, 12 Drawing Sheets

TRANSMIT POWER LEVEL DETERMINATION FOR COMMUNICATION BETWEEN AN EXTERNAL TRANSCEIVER AND AN IMPLANTABLE TRANSCEIVER

BACKGROUND

Field

The present disclosure relates generally to wireless communication between an implantable transceiver and an external transceiver, and more particularly, to apparatuses and methods for automatically adjusting the power level at which data is transmitted to account for changes in operational conditions including for example, a change in relative positions between the implantable transceiver and the external transceiver, or a change in the environment within which communication is taking place.

Background

Implantable medical devices, such as neurostimulators, pacemakers, and implantable cardio defibrillators (ICD), and external systems, such as programmers and patient monitors, communicate with each other during implant and after implant for purposes of device programming and data acquisition. For example, during device implantation a physician may evaluate a patient's condition by using the implanted device to acquire real-time physiological data from the patient and communicating the physiological data in real-time to an external programmer for processing and/or display. The physician may also program the implantable device based on the patient's condition and needs. After device implant, communication between the implantable device and an external system facilitates device reprogramming, and device interrogation during which device operation data and patient physiological data acquired by and stored in the implantable device are transmitted from the device to the external system.

Implantable medical devices and external systems communicate by way of telemetry. One type of telemetry is based on inductive coupling between two closely-placed coils using the mutual inductance between these coils. This type of telemetry is referred to as inductive telemetry. It may also be referred to as near-field telemetry due to the closeness of coils. In one example of inductive telemetry, an implantable device includes a communication interface with a first coil coupled to a transceiver, and the external system includes a communication interface with a second coil coupled to a transceiver. The communication interface of the external system may be embodied in a handheld device, e.g., wand, that is electrically connected to another component of the external system, such as a programmer computer.

To establish an inductive telemetry communication link between the implantable device and the external system, the wand is positioned over the patient in the area of the implanted device to place the coil of the wand in close proximity to the coil of the implantable device. The position of the wand relative to the implantable device affects the quality of the inductive communication link between the implantable device and the external system. For example, while a good quality inductive communication link between the device and system may exist initially, because the wand is handheld, it may move during a communication session to a position relative to the implantable device that reduces the quality of the inductive communication link or breaks the inductive communication link entirely. In some cases, communication errors may occur even if the external communication interface is not moved. For example, if the noise level, e.g., electrical signal interference, within the area of the communication session increases, communication errors may occur. Environmental conditions, such as the presence of metal near the devices, may also affect the communications link.

Another type of telemetry is radio frequency (RF) telemetry, which involves the transmission and reception of RF signals through antennas. In one example of RF telemetry, an implantable device includes a communication interface with a first antenna coupled to a transceiver, and the external system includes a communication interface with a second antenna coupled to a transceiver. This type of telemetry may also be referred to as near-field telemetry in cases where the implantable device and the external system are within close range of each other.

To establish a RF telemetry communication link between the implantable device and the external system, the patient with the implantable device is positioned in the area of the external system, e.g., within the same room. The positions of the implantable device and the external system relative to each other may affect the quality of the RF communication link between the implantable device and the external system. For example, while a good quality RF communication link between the device and system may exist initially, the patient with the implantable device may move during a communication session to a position relative to the external system that reduces the quality of the RF communication link or breaks the RF communication link entirely. In some cases, communication errors may occur even if the patient does not move. For example, if the noise level, e.g., electrical signal interference, within the area of the communication session increases, communication errors may occur. Environmental conditions, such as the presence of metal near the devices, may also affect the communications link.

There is a need in the implantable medical device field for communication apparatuses and methods that maintain quality communication between an implantable device and external device in the face of changing operational conditions including for example, a change in relative positions between the implantable device and the external system, or a change in the environment within which communication is taking place. The apparatuses and methods described below fulfil these needs.

SUMMARY

Disclosed herein are methods and apparatuses for periodically adjusting the power level at which signals are transmitted from a first communication interface to a second communication interface through a communications link. Periodic adjustment of the power level at which signals are transmitted, herein referred to as the "transmit power level," ensures that a quality communication link between the interfaces is maintained, particularly in circumstances where the relative positions of the interfaces or operating environment of the interfaces may change. In an example implementation, the first communication interface may be part of and external device that includes an external transceiver, while the second communication interface may be part of an implantable medical device that includes an internal transceiver.

In one embodiment, a range of power levels bounded by a minimum transmit power level and a maximum transmit power level is determined. A preferred transmit power level is selected from the range of power levels, and is used by the first communication interface to transmit signals to the second communication interface. Each of the minimum transmit power level and the maximum transmit power level is determined by intentionally causing a reception error to occur at the second communication interface. A reception error corresponds to a condition where a signal received by the second communication interface from the first communication interface, and decoded by the second communication interface does not match the signal as transmitted by the first communication interface.

The first communication interface may determine the minimum transmit power level by decreasing the transmit power level of a particular bit in a bit pattern until there is a reception error at the second communication interface. The first communication interface may then increase the transmit power level of the bit until there is no longer a reception error at the second communication interface. The transmit power level of the particular bit may be further adjusted, back and forth between decreases and increases, until a final minimum transmit power level is arrived at.

Regarding the maximum transmit power level, the first communication interface may determine it by increasing the transmit power level of a particular bit in a bit pattern until there is a reception error at the second communication interface. The first communication interface may then decrease the transmit power level of the bit until there is no longer a reception error at the second communication interface. The transmit power level of the particular bit may be further adjusted, back and forth between increases and decreases, until a final maximum transmit power level is arrived at. Once the minimum and maximum transmit power levels are determined, the preferred transmit power level may be selected from within the power level range. For example, the preferred transmit power level may be the mean or median of the minimum and maximum transmit power levels.

In another embodiment, a minimum power of a transmit power range is determined by adjusting a power level at which a first specified bit is transmitted from a first communication interface to a second communication interface. The power level is repeatedly adjusted until a specified event occurs as a result of the repeated adjusting. The specified event may be one of the following: 1) an occurrence of a particular pattern in a set of minimum power detection outcomes obtained from the second communication interface, 2) an expiration of a minimum power determination time period, and 3) an occurrence of consecutive adjusted power levels that are within a threshold value of each other.

Next, a maximum power of the transmit power range is determined by adjusting a power level at which a second specified bit is transmitted from the first communication interface to the second communication interface. The power level is repeatedly adjusted until a specified event occurs as a result of the repeated adjusting. The specified event may be one of the following events: 1) an occurrence of a particular pattern in a set of maximum power detection outcomes obtained from the second communication interface, 2) an expiration of a maximum power determination time period, and 3) an occurrence of consecutive adjusted power levels that are within a threshold value of each other.

After the transmit power range is determined, the transmit power level for signals to be transmitted from the first communication interface to the second communication interface is set to a preferred power level within the transmit power range. The preferred transmit power level may be the mean or median of the minimum and maximum transmit power levels.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms. Accordingly, the drawings and detailed description are to be regarded as illustrative in nature and not as restrictive.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Disclosed herein in detail are embodiments of communication apparatuses and methods that periodically adjust the power level at which signals are transmitted from a first communication interface of an external device to a communication interface of an implantable device. These periodic adjustments ensure that a quality communication link between the interfaces is maintained, particularly in circumstances where the relative positions of the interfaces or operating environment of the interfaces may change.

Overview of Implantable Medical Device and External Device

Figure 1:
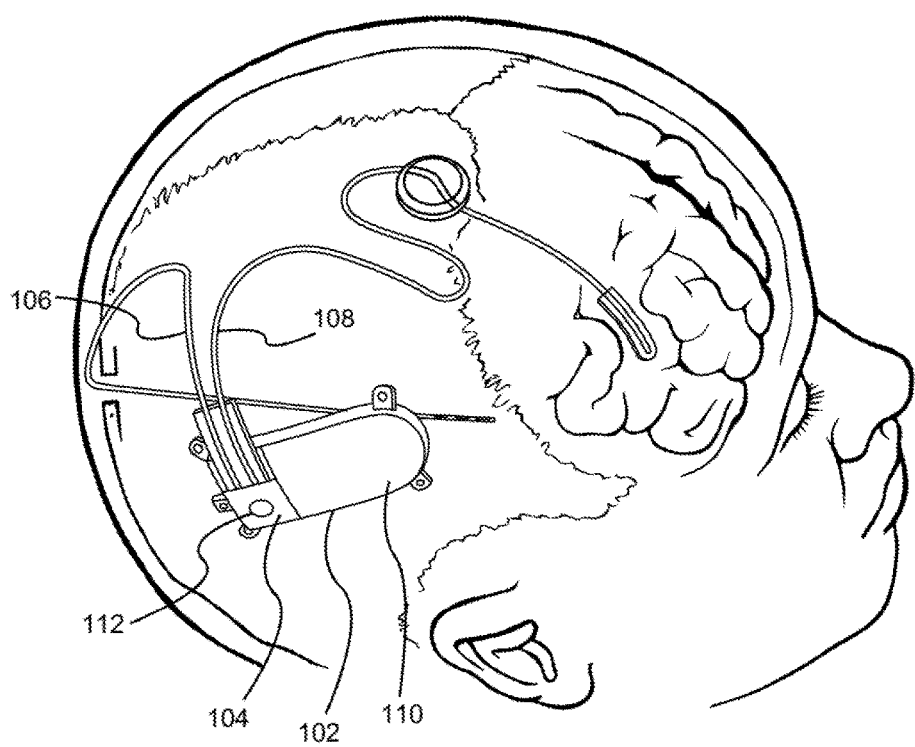
FIG. 1 is a perspective, schematic view of a patient's cranium in which components of an implantable medical system are implanted, including an implantable medical device, e.g., a neurostimulator, and leads connected to the device and extending on or into the patient's brain.

FIG. 1 is a perspective, schematic view of a patient's cranium in which components of an implantable medical system are implanted, including an implantable medical device 102, e.g., a neurostimulator, and two electrode-bearing leads 106, 108, which are connected to the implantable medical device. The implantable medical device 102 includes a lead connector 104 adapted to receive one or more of the brain leads, such as a deep brain or depth lead 106 and a cortical strip lead 108. (The depth lead 106 is intended to be implanted so that a distal end of it is situated within the patient's neural tissue, whereas the cortical strip lead 108 is intended to be implanted under the dura mater so that a distal end of it rests on a surface of the brain). The lead connector 104 acts to physically secure the leads 106, 108 to the implantable medical device 102, and facilitates electrical connection to conductors in the leads coupling one or more electrodes at or near a distal end of the lead to circuitry within the implantable medical device 102.

The implantable medical device 102 includes a durable outer housing 110 fabricated from a biocompatible material, such as titanium. The housing 110 encloses a battery and other electronic circuitry, to provide the functionality described herein, as well as any other features. For example, to facilitate communication between the implantable medical device 102 and an external device, the housing 110 may enclose a transceiver and other components of a communication interface. A telemetry coil 112 or RF antenna (not shown) may be provided outside of the housing 110 (and potentially integrated with the lead connector 104 or an outer surface of the housing 110) and coupled to the communication interface to further facilitate communication between the implantable medical device 102 and an external device.

Figure 2:
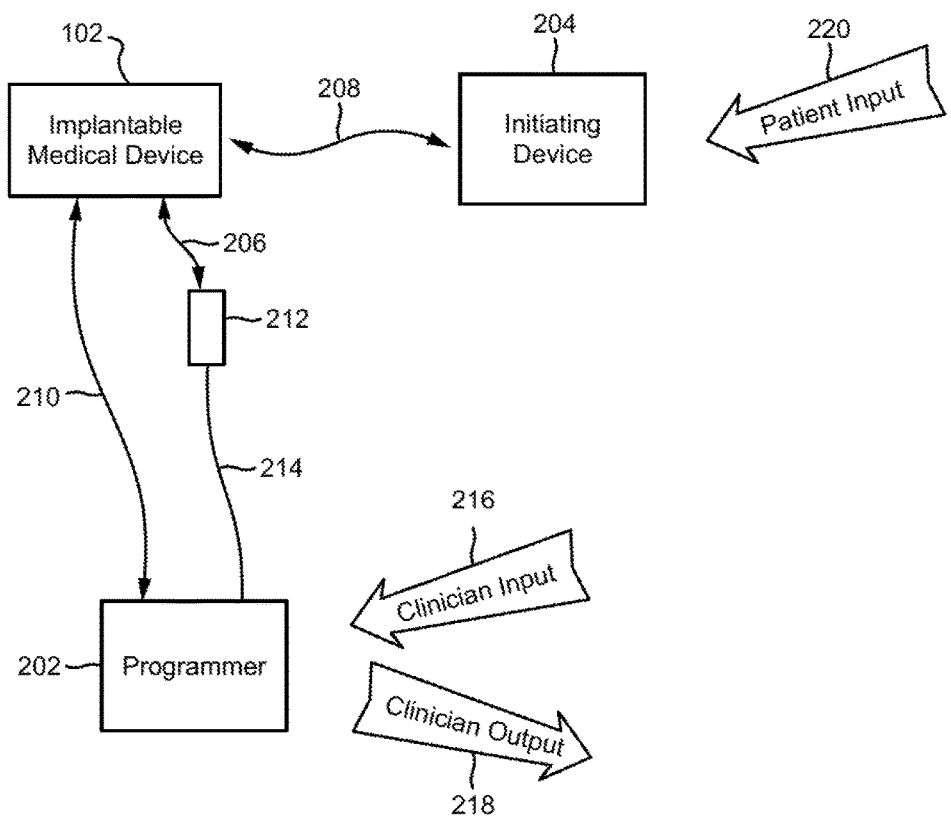
FIG. 2 is a block diagram illustration of a medical system including an implantable medical device and various external devices, e.g., remote monitor and programmer, with which the implantable medical device may communicate.

FIG. 2 is a block diagram illustration of a medical device system including an implantable medical device 102 and various external devices, e.g., a programmer 202 and an initiating device 204, with which the implantable medical device may communicate. Each of the implantable medical device 102, the programmer 202, and the initiating device 204 includes a communication interface that allows for communication between devices through a wireless communication link 206, 208, 210. A wireless communication link may be a short-range inductive telemetry link 206, or a long-range RF telemetry link 208, 210.

In a case of short-range inductive telemetry, an inductive wireless communication link 206 may be established, for example, between an implantable medical device 102 and a programmer 202 using an external communication interface 212. The external communication interface 212 may be electrically coupled to the programmer 202 at one end through a wire 214, and configured for placement relative to the implantable medical device 102 at the other end. The external communications interface 212 includes a transceiver, a telemetry coil and other circuitry configured to communicate by inductive telemetry with corresponding components of an internal communication interface included in the implantable medical device. For example, the external communication interface 212 may be a handheld wand, in which case a wireless communication link 206 between the implantable medical device 102 and the programmer 202 may be established by moving the wand into communication range of the implantable medical device 102.

With respect to long-range RF telemetry, a RF wireless communication link 208, 210 between an implantable medical device 102 and an external device 202, 204 may be established using an external communication interface having a transceiver, an RF antenna and other circuitry configured to communicate by RF telemetry with corresponding components of an internal communication interface included in the implantable medical device. In this case, the external communication interface may be located within the external device 202, 204.

Once a communication link 206, 208, 210 is established between the implantable medical device 102 and an external device 202, 204, the external device may be used to transmit information to or receive information from the implantable medical device. The external device 202, 204 may also be used to manually control the operation of the implantable medical device 102. For example, a programmer 202 may be used by a physician or caregiver to: 1) specify and set variable operational parameters in the implantable medical device 102 (e.g., stimulation parameters according to which the device will generate and then deliver to the patient through one or more of the lead electrodes a form of electrical stimulation and detection parameters that determine what features of a monitored electrographic signal the device will identify and detect), 2) upload or receive data from the implantable medical device to the programmer, 3) download or transmit program code and other information from the programmer to the implantable medical device, or 4) command the implantable medical device to perform specific actions or change modes. To facilitate these functions, the programmer 202 is adapted to receive clinician input 216 and to communicate such input to the implantable medical device 102 over the relevant communication link 206, 210. The programmer 202 is also adapted to receive information from the implantable medical device and to provide such information to the physician or caregiver in the form of clinician output 218.

The programmer 202 may be a commercially available personal computer, such as in the form of a laptop, a tablet, or a workstation having a suitable central processing unit (CPU), user interface and accessories such as a keyboard, mouse and display, and running a standard operating system. The programmer 202 also might be implemented as a turnkey system, with a custom software package so that the unit can be used only for functions dedicated to the medical system, for example, to minimize cybersecurity vulnerabilities.

The initiating device 204 (sometimes referred to as a "remote monitor") is typically controlled by the patient or a caregiver. Patient input 220 from the initiating device 204 is transmitted over the wireless communication link 208 to the implantable medical device 102. The patient input 220 may be used to cause the implantable medical device 102 to: 1) switch modes, e.g., turn between on to off, or perform an action, e.g., store a record of electrographic data, 2) upload or receive data from the implantable medical device 102, 3) download or transmit program code and other information to the implantable medical device 102, or command the device to perform specific actions (e.g., such as to command the device to store a record of data when the patient thinks she is having a seizure). The initiating device 204 may be a computer configured as a laptop, a tablet, a smart phone or some other portable or mobile device.

Figure 3:
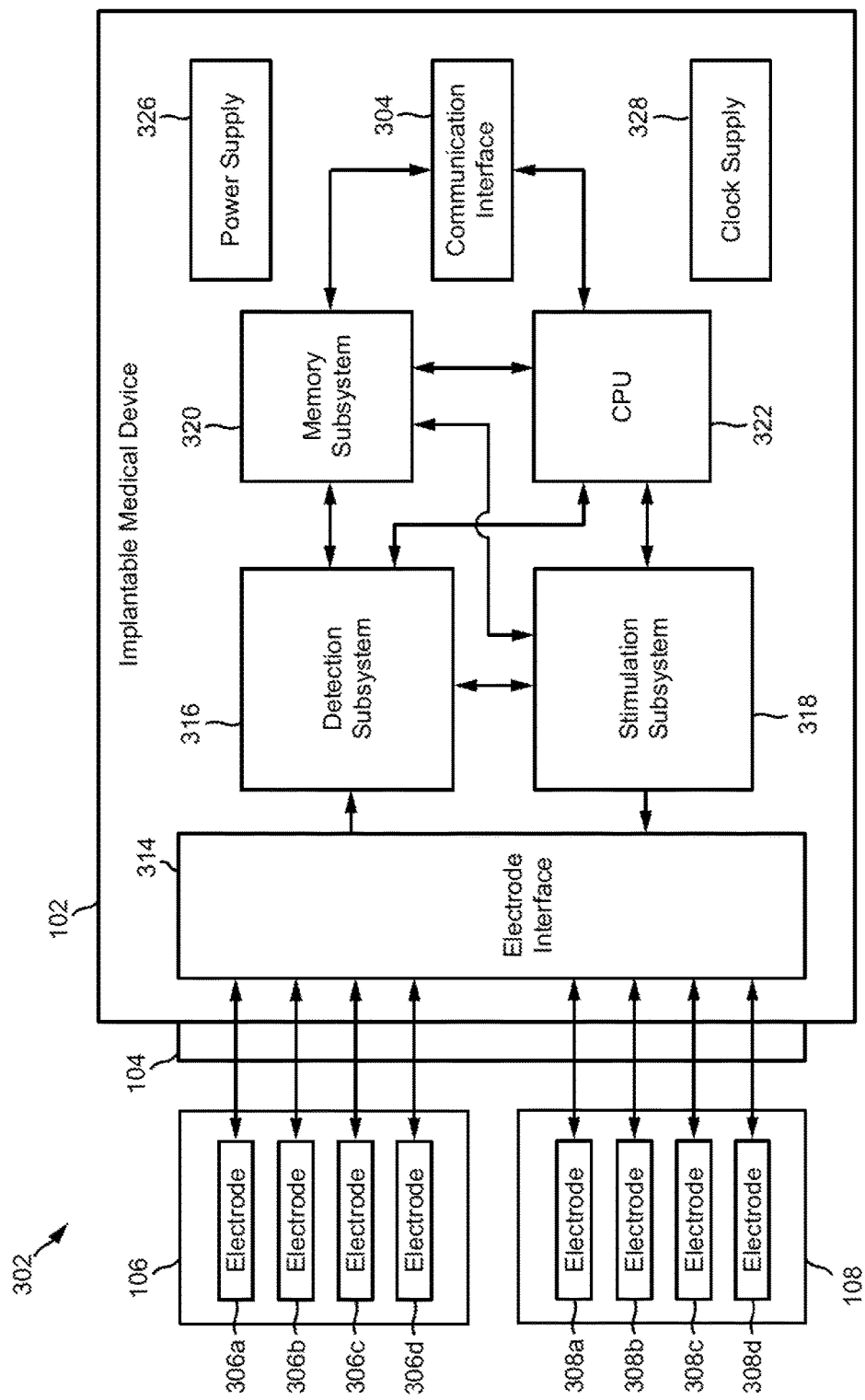
FIG. 3 is a block diagram of an implantable medical system including an implantable medical device and a lead connected to the device, and illustrating subsystems and components of the implantable medical device including a communications interface for communicating with external devices.

FIG. 3 is a block diagram of an implantable medical system 302 including an implantable medical device 102 having a communications interface 304 configured to facilitate wireless communication with an external device. The communications interface 304 operates together with a communications interface of the external device in accordance with techniques described more fully below, to periodically determine an optimal power level at which to transmit signals to maintain a quality communication link between the devices.

The implantable medical system 302 may be a neurostimulation system, in which case the implantable medical device 102 may be a neurostimulator having two brain leads 106, 108 coupled to it, with each lead bearing four electrodes 306a-d, 308a-d. The neurostimulator 102 includes a lead connector 104 adapted to receive a connector end of each brain lead 106, 108, to thereby electrically couple each lead and its associated electrodes 306a-d, 308a-d with the neurostimulator.

The neurostimulator 102 may configure an electrode 306a-d, 308a-d as either a sensor (for purposes of sensing electrical activity of the brain, which activity is subsequently processed by other components of the neurostimulator) or a stimulator (for purposes of delivering therapy to the patient in the form of electrical stimulation) or both. Although eight electrodes 306a-d, 308a-d are shown in FIG. 3, more electrodes may be available depending on the number of implanted leads and the number of electrodes per lead.

The electrodes 306a-d, 308a-d are connected to an electrode interface 314. The electrode interface 314 is configured to select one or more of the electrode 306a-d, 308a-d, for coupling to the detection subsystem 316 for purposes of detecting neurological events, and to select one or more of the electrodes for coupling to the stimulation subsystem 318 for purposes of delivery stimulation therapy. The electrode interface 314 may also provide any other features, capabilities, or aspects, including but not limited to amplification, isolation, and charge-balancing functions, that are required for a proper interface with neurological tissue.

The detection subsystem 316 may include an EEG analyzer. The EEG analyzer is configured to receive signals from selected electrode 306a-d, 308a-d, through the electrode interface 314, and to process those signals to identify neurological events, e.g., neurological activity indicative of a seizure, an onset of a seizure, or a precursor to a seizure. The stimulation subsystem 318 is configured to generate electrical stimulation, and to output the electrical stimulation to neurological tissue through selected electrode 306a-d, 308a-d.

The neurostimulator 102 also includes a memory subsystem 320 and a central processing unit (CPU) 322, which can take the form of a microcontroller. The CPU 322 is connected to the detection subsystem 316 and the stimulation subsystem 318, and controls the operation of these subsystems. The memory subsystem 320 is coupled to the detection subsystem 316 (e.g., for receiving and storing data representative of sensed EEG signals), the stimulation subsystem 318 (e.g., for providing stimulation waveform parameters to the stimulation subsystem), and the CPU 322, which can control the operation of the memory subsystem 320. In addition to storing EEG waveform data (ECoG's), the memory subsystem 320 may also store detailed event data regarding neurological event detection activity, long-term histogram data on event detections, and device diagnostic information, such as battery voltage, lead impedance, and telemetry usage.

The communication interface 304 enables communication between the implantable medical device 102 (FIG. 2) an external device 202, 204 (FIG. 2). As mentioned above, in accordance with techniques described below, the communications interface 304 operates together with a communications interface of an external device to periodically determine an optimal power level at which to transmit signals to maintain a quality communication link between the devices. The communication interface 304 may include a telemetry coil (which may be situated outside of the housing) and a transceiver together with other telemetry circuitry that enables short-range transmission and reception of signals, to or from the implantable medical device, via inductive coupling. The communication interface 304 may also include an RF antenna (which also may be situated outside of the housing) and a transceiver together with other telemetry circuitry that enables long-range transmission and reception of signals, to or from the implantable medical device, via RF telemetry.

The implantable medical device 102 further includes a power supply 326 and a clock supply 328. The power supply 326 supplies the voltages and currents necessary for each of the other subsystems. The clock supply 328 supplies substantially all the other subsystems with any clock and timing signals necessary for their operation.

Figure 4:
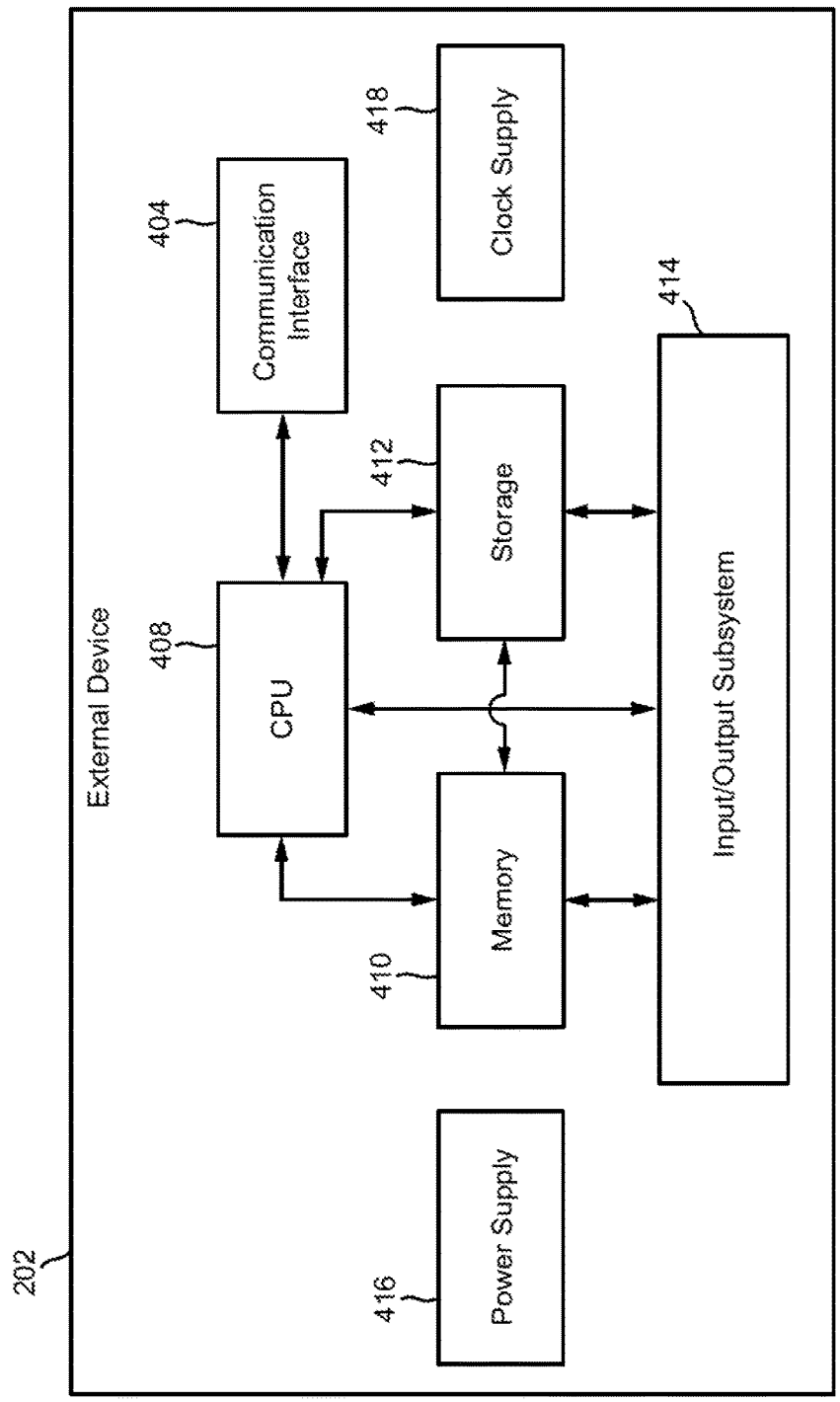
FIG. 4 is a block diagram of an external device illustrating subsystems and components of the external device including communication interfaces for communicating with an implantable medical device.

FIG. 4 is a block diagram of an external device 202 illustrating subsystems and components of the external device including a communication interface 404 for communicating with an implantable medical device. The communication interface 404 may be an inductive short-range telemetry system, e.g., wand, including an inductive coil, or a long-range RF telemetry system including an RF antenna, configured to communicate with a communication interface of an implantable medical device. The communication interface 404 operates together with a communications interface of the implantable medical device in accordance with techniques described more fully below, to periodically determine an optimal power level at which to transmit signals to maintain a quality communication link between the devices.

The external device 402 is controlled by a CPU 408. The CPU 408 is coupled, either directly or through a bus controller, to the communication interface 404, a memory subsystem 410 for programming and short-term storage, a storage subsystem 412 (which might include a hard drive, flash memory, and other non-volatile storage), and an input/output subsystem 414 used to pass information to and receive information from a user. The memory subsystem 410 may include ROM, dynamic RAM, and other random-access memory. The storage subsystem 412 may include a hard drive, flash memory, and other non-volatile storage.

The operation of the external device 402 is controlled by a power supply 416 and a clock supply 418. The power supply 416 typically includes batteries. Alternatively, the external device 402 may receive power from an AC outlet. A combination of the two sources might also be used. The clock supply 418 supplies substantially all the other subsystems of the external device 402 with any clock and timing signals necessary for operation.

Figure 5:
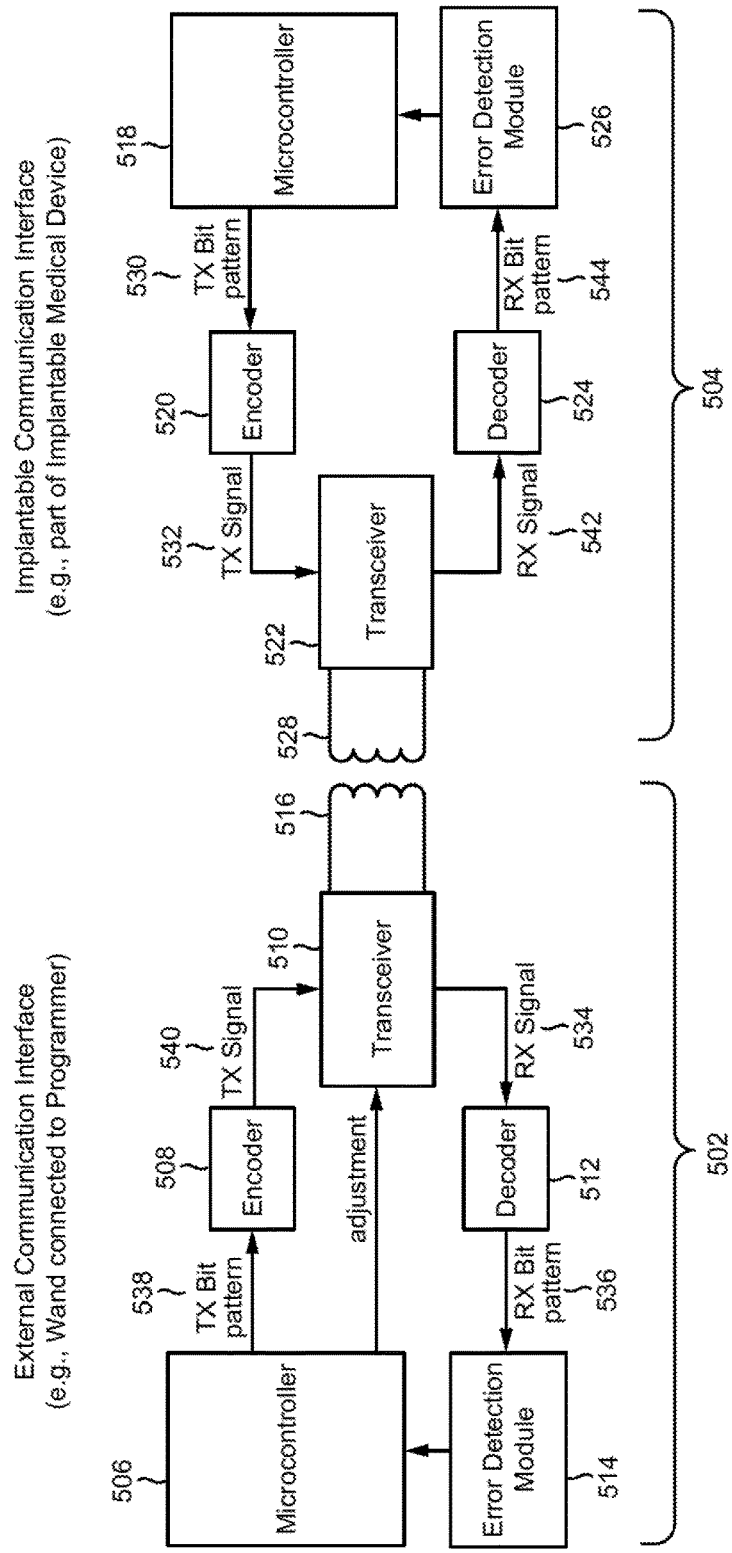
FIG. 5 is a block diagram illustrating components of an external communication interface and an implantable communication interface.

Inductive Telemetry Communication Between an Implantable Device and an External Device FIG. 5 is a block diagram of a communication interface 502 of an external system and a communication interface 504 of an implantable medical device positioned relative to each other for short-range inductive telemetry communication. The external communication interface 502 may correspond to the local communication interface 406 of the external device 402 of FIG. 4, while the implantable communication interface 504 may correspond to the communication interface 304 of the implantable medical device of FIG. 3. The communication interfaces 502, 504 may form a bidirectional communication link between an implanted device and an external device. For example, the external communication interface 502 may be a wand that is connected to a programmer, and the implanted communication interface 504 may be part of an implantable neurostimulator.

The external communication interface 502 includes a microcontroller 506, an encoder 508, a transceiver 510, a decoder 512, an error detection module 514, and a first inductive coil 516. The microcontroller 506, encoder 508, decoder 512, and error detection module 514 may collectively be referred to as the "communication circuitry" of the external communication interface 502. Likewise, the implantable communication interface 504 includes a microcontroller 518, an encoder 520, a transceiver 522, a decoder 524, an error detection module 526, and a second inductive coil 528. The microcontroller 518, encoder 520, decoder 524, and error detection module 526 may collectively be referred to as the "communication circuitry" of the implantable communication interface 504. Together, the first inductive coil 516 and the second inductive coil 528 constitute a transformer coil arrangement for facilitating bidirectional telemetry between the external communication interface 502 and the implantable communication interface 504.

With respect to signals transmitted by the implantable communication interface 504 and received by the external communication interface 502, the microcontroller 518 of the implantable communication interface outputs a transmit bit pattern 530 to the encoder 520. The encoder 520 converts the bit pattern 530 to a transmit signal 532 using a modulation scheme. In one configuration, the modulation scheme encodes 1-bit per bit time frame (or 1-bit per symbol time). In this modulation scheme, a series of bits is transmitted as a series of pulses in accordance with a specified timing requirement such that one pulse is transmitted during each of a defined period of time. For example, a timing requirement may define that one pulse is transmitted during a 45-microsecond time frame. This modulation scheme may be referred to as on-off keying with return to zero. The transceiver 522 transmits the series of pulses by energizing or not energizing the second transmit coil 528 as defined by the bit pattern 530, wherein a pulse corresponding to a '1' bit is produced by energizing the second transmit coil during a time frame and a pulse corresponding to a '0' bit is produced by not energizing the second transmit coil during a time frame.

On the receive end, the transceiver 510 of the external communication interface 502 receives the series of pulses through the first transmit coil 516. The transceiver 510 provides the receive signal 534 to the decoder 512. The decoder 512 processes the receive signal 534 in accordance with the timing requirement by which the bit pattern was transmitted and determines a receive bit pattern 536 that corresponds to the receive signal. More specifically, the decoder 512 determines the energy level of each of the pulses of the received signal 534 during each of a corresponding time frame, and decodes the pulse as a '1' bit if the energy level of the pulse is above an energy threshold and a '0' bit if the energy level of the pulse is below the threshold. The decoder 512 processes the series of pulses to obtain a signal representative of the bit pattern.

The receive bit pattern 536 determined by the decoder 512 is then provided to the error detection module 514. The error detection module 514 processes the receive bit pattern to determine if there is an error. For example, the receive bit pattern 536 may include an error detection code that consists of a number of bits out of the entirety of bits in the bit pattern. The error detection module 514 may include a look up table of valid error detection codes. The error detection module 514 compares the received code against the list of valid codes. If the error detection code included in the receive bit pattern 536 does not match a valid code, the error detection module 514 concludes that the receive signal 534 was not accurately received by the external communication interface.

With respect to signals transmitted by the external communication interface 502 and received by the implantable communication interface 504, the microcontroller 506 of the external communication interface outputs a transmit bit pattern 538 to the encoder 508. The encoder 508 converts the bit pattern 538 to a transmit signal 540 using a modulation scheme like that described above for the implantable communication interface 504. The transceiver 510 transmits the series of pulses by energizing or not energizing the second transmit coil 516 as defined by the bit pattern 538, wherein a pulse corresponding to a '1' bit is produced by energizing the second transmit coil during a time frame and a pulse corresponding to a '0' bit is produced by not energizing the second transmit coil during a time frame.

On the receive end, the transceiver 522 of the implantable communication interface 504 receives the series of pulses through the second transmit coil 528. The transceiver 522 provides the series of pulses as a receive signal 542 to the decoder 524. The decoder 524 processes the series of pulses in the receive signal 542 and determines a receive bit pattern 544 that corresponds to the receive signal. More specifically, the decoder 524 determines the energy level of each of the pulses of the receive signal 542 during each of a corresponding time frame, and decodes the pulse as a '1' bit if the energy level of the pulse is above an energy threshold and a '0' bit if the energy level of the pulse is below the threshold. The decoder 524 processes the series of pulses to obtain a signal representative of the bit pattern.

The receive bit pattern 544 determined by the decoder 524 is then provided to the error detection module 526. The error detection module 526 processes the receive bit pattern to determine if there is an error. For example, the receive bit pattern 544 may include an error detection code that consists of a number of bits out of the entirety of bits in the bit pattern. The error detection module 526 may include a look up table of valid error detection codes. The error detection module 526 compares the received code against the list of valid codes. If the error detection code included in the receive bit pattern 544 does not match a valid code, the error detection module 526 concludes that the receive signal 542 was not accurately received by the external communication interface.

The error detection module 526 provides an error code detection result, which may be referred to as a "parity result," to the microcontroller 518. The microcontroller 518 generates a transmit bit pattern 530 to convey the parity result to the external communication interface 502. The parity result is transmitted to and processed by the external communication device 502, as described above.

Figure 6:
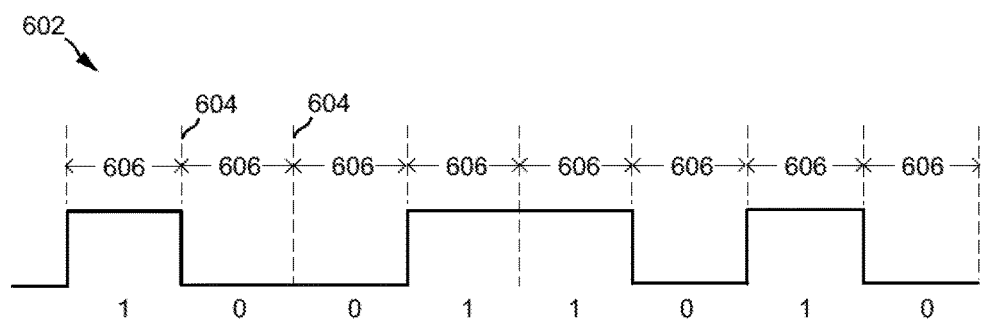
FIG. 6 is a schematic representation of a bit pattern encoded in accordance with a 1-bit per time frame (or 1-bit per symbol time) scheme.

As previously mentioned, inductive telemetry communication between the external communication interface 502 and the implanted communication interface 504 may be based on a scheme that encodes 1-bit per bit time frame (or 1-bit per symbol time). FIG. 6 is a schematic representation of a bit pattern encoded in accordance with a 1-bit per time frame scheme. The modulation scheme may be referred to interchangeably as a pulse amplitude modulation (PAM) or a pulse position modulation (PPM) scheme. The dashed vertical lines 604 in FIG. 6 define the boundaries for each time frame 606 or symbol time, and the solid line 608 represents the energy level of the transmitted signal. The signal may be transmitted as a series of energy pulses, wherein each pulse is transmitted in a symbol time 606 and has a corresponding energy level or transmit power level that may be measured, for example, in units of volts or micro amps. On the receive end, the receiving communication interface detects for a pulse during each of the symbol times. If the receiving communication interface detects an energy level that satisfies a criterion, the interface decodes the pulse as a '1' bit, otherwise it decodes the pulse as a '0' bit. In one configuration, the criterion may be a current threshold, e.g., ~100 uA, in which case the criterion is satisfied when the energy level exceeds the threshold value.

In the case of a PAM scheme, for each symbol time 606 the energy level corresponding to the solid line 608 must satisfy a criterion for the entire symbol time in order for the symbol to decode as a '1' bit, otherwise the symbol will decode as '0' bit. In the case of a PPM scheme, for each symbol time 606 the solid line 608 must be above a certain threshold for a certain portion of a symbol time 606 to decode as a '1' bit, otherwise it will decode as '0' bit. In a 1-bit per symbol communication scheme, the portion of time is the entire symbol time 606. As such, in the 1-bit per symbol communication scheme, the PPM scheme is essentially equivalent to the PAM scheme.

Figure 7:
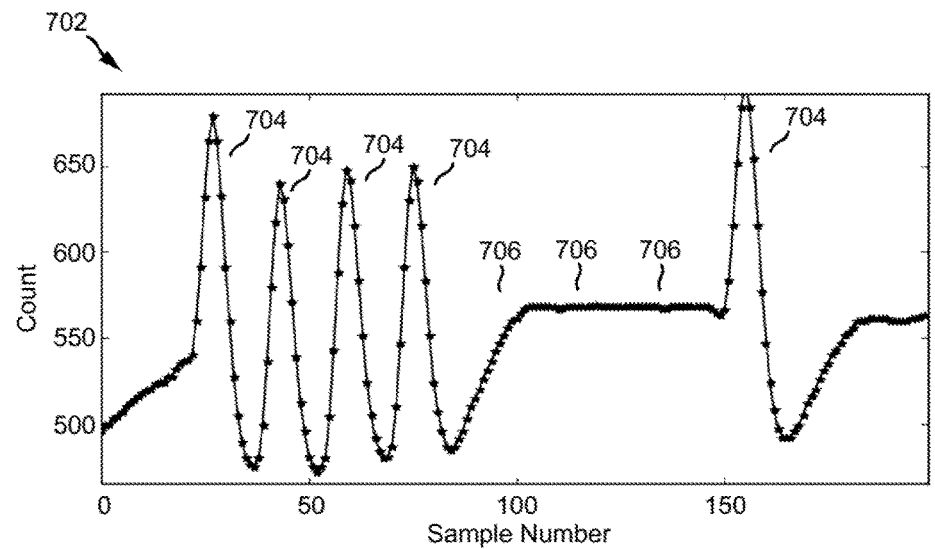
FIG. 7 is an example of a signal trace representing a bit pattern received by an external communication interface.

With reference to FIG. 7, an example of a signal trace 702 received or detected by an external communication interface, e.g., a wand, and representative of the bit pattern 11110001 is shown. As previously mentioned, the modulation scheme for communication may encode 1-bit per bit time frame. In FIG. 7, the time frames correspond to a particular number of samples, e.g., 25 samples. In cases where the portion of the signal 702 within a particular time frame satisfies a criterion, the pulse corresponding to that time frame is read as a '1' bit, otherwise the bit is read as a '0' bit. For example, in FIG. 7, portions of the signal 702 within some of the time frames are sine waves 704 having a peak-to-peak amplitude greater than a specified threshold amplitude, e.g., 100 counts. These sine waves 704 are decoded as '1' bits. Portions of the signal 702 within other time frames are substantially flat and do not satisfying the specified threshold amplitude. These portions 706 are decoded as '0' bits.

Returning to FIG. 5, in order for communication between the external communication interface 502 and the implanted communication interface 504 to be effective, it is critical that the respective interfaces transmit signals at a transmit power level sufficient to ensure detection and accurate decoding by the receiving communication interface. If transmit power levels are insufficient, communication errors may result. For example, in the case of a transmit power level that is too low, a signal pulse transmitted by a transmitting interface at a power level corresponding to a '1' bit, may be decoded as a '0' bit by the receiving interface when the power level of the signal pulse received by the receiving transmitter is below a threshold value. Furthermore, the transmit power level used by the transmitting interface may be so low that the receiving interface does not detect the signal at all, and thus does not respond to the transmitting interface. This may cause the transmitting interface to retransmit the signal, which consumes energy and reduces communication efficiency. In the case of a transmit power level that is too high, electronics in the receiving transceiver may become saturated by the received signal, thus making it difficult or impossible to decode the signal.

During a communication session between an external communication interface 502 and an implanted communication interface 504, transmit power levels may be adjusted by each communication interface. In some cases, one of the external communication interface 502 and the implanted communication interface 504 may be more sensitive when it comes to detecting signals and thus is able to detect signals within a wide range of energy levels. Such an interface may be described as having a wide or far detection range. Adjustment of transmit power levels by an interface having a far reception range may not be necessary. For example, an external communication interface 502, e.g., wand, may have a far detection range due to its large coil, such that signals transmitted through the smaller coil of the implanted communication interface 504 are readily detected by the external communication interface. Conversely, an implanted communication interface 504 may have a narrow detection range due to its small transmit coil such that signals transmitted by the external communication interface 502 may not be readily detected by the implanted communication interface. The signal detection range of an implanted communication interface 504 may be further narrowed or weakened by a change in distance or alignment between the implanted communication interface 504 and the external communication interface 502. For these reasons, adjustments to the transmit power level of an external communication interface 502 may be necessary to ensure consistent and accurate reception of the signal by the implanted communication interface.

In a conventional technique of adjusting the transmit power level of an external communication interface 502, the external communication interface may estimate the distance between itself and the implanted communication interface 504 and adjust its transmit power accordingly. To this end, the external communication interface 502 may store a lookup table that maps the power level of received signals to transmit power levels. A power level of a received signal corresponds to a power level of a signal as received by the external communication interface from an implanted communication interface 502. The transmit power level corresponds to a power level to be used by the external communication interface 502 when transmitting signals to the implanted communication interface 504. Upon receiving a signal from the implanted communication interface 504, the external communication interface 502 determines the power level of the received signal and, using the lookup table, determines the transmit power level that is mapped to the determined power level of the received signal. During a subsequent signal transmission by the external communication interface 502 to the implanted communication interface 504, the transmit power level used by the interface may be adjusted upward or downward to correspond to the just determined transmit power level.

While the above describe conventional technique may assist in maintaining a power transmit level of an external communication interface 502 at a sufficient level for effective communications, it is deficient in that it is based exclusively on the analysis of signals communicated from the implanted communication interface 504 to the external communication interface 502. The technique does not take into account signals communicated from the external communication interface 502 to the implanted communication interface 504. In other words, the technique does not assess the accuracy of signal reception by the implanted communication interface 504.

Described below is a technique by which an external communication interface may automatically adjust its transmit power level during communication in a manner that accounts for signal reception by an implanted communication interface. However, prior to fully describing the technique, a further description of issues that may arise during inductive telemetry communications is provided.

Inductive Telemetry Issues

The ability of an inductive telemetry communication link between two distinct devices to provide accurate and consistent data communication is a function of the relative positions of the inductive coils of the two devices. For example, the distance between the two coils and the alignment of the two coils are factors that affect an inductive communication link.

As previously described, to establish a communication link between an implantable device and an external system, an external communication interface 502, e.g., wand, is positioned over the patient in the area of the implanted device to place the coil of the wand in close proximity to the coil of the implantable device. The position of the wand relative to the implantable device affects the quality of the communication link between the implantable device and the external system. For example, while a good quality communication link between the device and system may exist initially, because the wand is handheld, it may move during a communication session to a position relative to the implantable device that reduces the quality of the communication link or breaks the communication link entirely. In some cases, communication errors may occur even if the external communication interface is not moved. For example, if the noise level, e.g., electrical signal interference, within the area of the communication session increases, communication errors may occur. Environmental conditions, such as the presence of metal near the devices, may also affect the communications link.

Figure 8A:
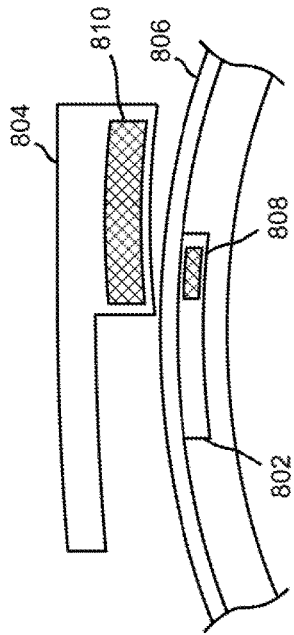
FIGS. 8A-8D are schematic illustrations of different positional arrangements between an implantable medical device and an external device.

With reference to FIGS. 8A-8D, in the case of an implantable device 802, such an a neurostimulator implanted in the skull as shown in FIG. 1, and an external device 804, such as a communication wand, a communication link may be established by placing the wand on or near the scalp in the vicinity of the implanted device. The location of the implantable device 802 may be determined by a patient or care provider through touching the scalp 806 in the known area of the implant. Once the general location of the implantable device 802 is determined, the wand 804 is preferably placed a minimal distance, e.g., within 3 to 5 centimeters, from the scalp 806 with the respective inductive coils 808, 810 of the devices generally aligned along their center axes, as shown in FIG. 8A. Positioned as such, error free communication may be maintained between the devices 802, 804.

Initial placement of the external communication interface is somewhat of a trial and error process in that even though the patient or physician may know the outline location of the implanted device by touch, they may not know the location of the transmitter within that outline. Furthermore, because the external communication interface is held in place by hand, the interface is subject to movement during a communication session. Accordingly, even after proper initial placement of the external communication interface, subsequent movement of the interface may affect the communication link.

Figure 8B:
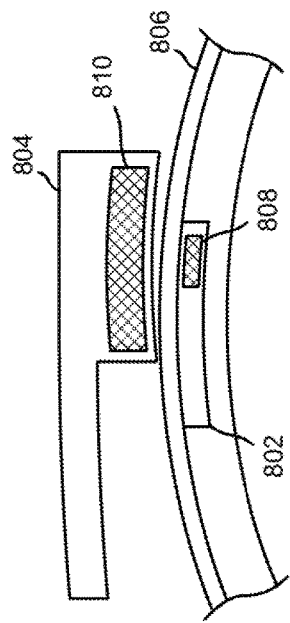
Figure 8C:
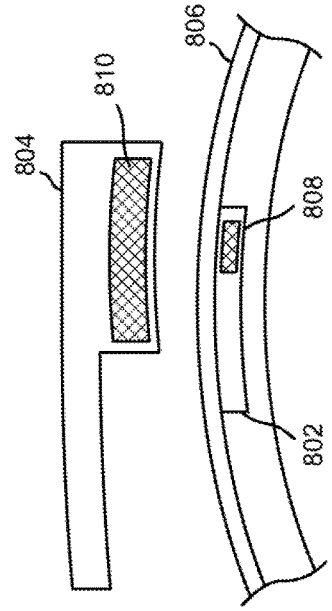

For example, with reference to FIG. 8B, the external device 804 may be moved to a location that results in misalignment between the respective inductive coils 808, 810 of the devices, while at the same time being positioned closer to the scalp 806 and hence closer to the device. Placing the external device 804 too close to the implantable device 802 may cause reception errors at the implantable device because the signals transmitted to the implantable device by the external device are at too high of an energy level. However, in the arrangement of FIG. 8B, misalignment of the coils 808, 810 results in a need for higher energy signal transmission by the external device. Accordingly, the combination of misaligned coils and close placement of the external device may still result in error free communication between the devices.

Figure 8D:
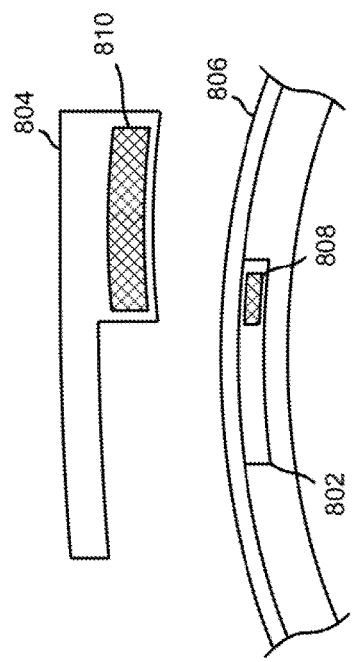

In other cases, however, movement of the external device 804 may alter the effectiveness of the inductive communication link between the implantable device 802 and the external device 804. For example, with reference to FIG. 8C, an external device 804 may be moved to a location that results in misalignment between the respective inductive coils 808, 810 of the devices, while at the same time being moved too far away from the scalp 806. In this arrangement, communication errors are likely. With reference to FIG. 8D, an external device 804 may be moved to a location that maintains good alignment between the respective inductive coils 808, 810 of the devices, but is too close to the scalp 806. In this arrangement, communication errors are likely because the signals transmitted to the implantable device by the external device are at too high of an energy level.

Automated Power Adjustment During Communication

In accordance with embodiments disclosed herein, an apparatus and method are provided for automatically adjusting a transmit power level for signals to be transmitted from a first communication interface to a second communication interface. In the following example description of the apparatus and method, and with reference to FIG. 5, the first communication interface is an external communication interface 502, such as a wand, and the second communication interface is an implantable communication interface 504, such as may be included in an implantable neurostimulator. The apparatus and method are equally applicable to an opposite arrangement, wherein the first communication interface is part of an implantable device and the second communication interface is an external device.

As previously described with reference to FIG. 8, during a communications session between an external device 804 and an implantable device 802, the external device may be repositioned relative to the implantable device in a way that may affect the strength of the communication link between the two devices. Also, the environment in which the devices 802, 804 are communicating may change in a way that affects the communication link. For example, there may be an increase in electrical signal noise in the environment within which the communication is occurring. To account for these possible effects on the communication link, the external device 804 may be configured to periodically assess its communication link with the implantable device 802 and to adjust the power level at which the external device transmits signals to the implantable device as needed in order to maintain an effective communication link.

To this end, the power level at which signals are transmitted by the external device 804 may be increased when the communications link is weakened due to one or more of a repositioning of the external device relative to the implantable device 802, or an increase in environmental noise. Conversely, the power level at which signals are transmitted by the external device 804 may be decreased when the communications link is strengthened due to one or more of a repositioning of the external device or a reduction in environmental noise. Sometimes, repositioning of the external device 804 or changes in environmental noise may not affect the communication link. In these cases, the power level at which signals are transmitted by the external device would most likely not have to change.

To assess the communication link between the external device 804 and the implantable device 802, the external device periodically determines each of a minimum transmit power level and a maximum power level at which successful communication may occur over the communication link. Once the minimum transmit power level and the maximum power level are determined, the external device 804 sets the transmit power level to a value within a transmit power range bounded by the minimum and maximum transmit power levels.

Figure 9:
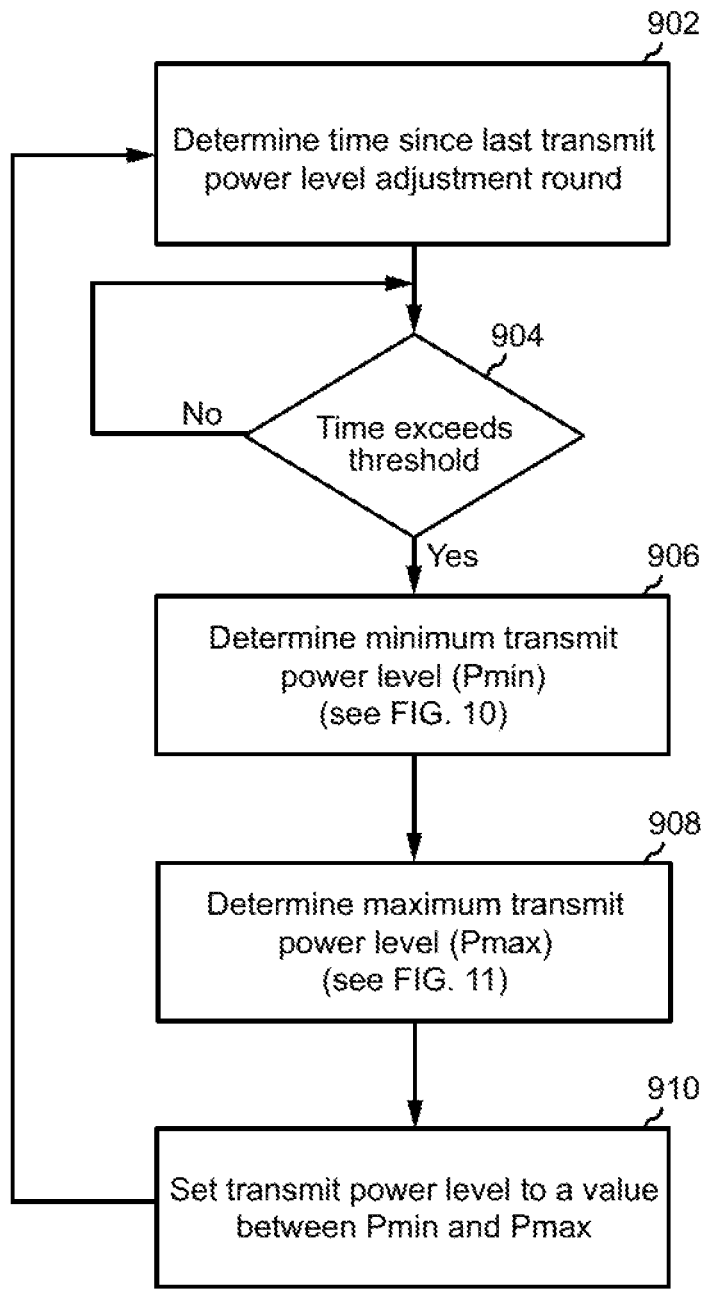
FIG. 9 is a flow chart of a method of adjusting a transmit power level of signals to be transmitted from a first communication interface to a second communication interface, based on a minimum transmit power and a maximum transmit power.

In one implementation of periodic assessment of a communication link, and with reference to FIG. 8 and FIG. 9, at block 902, the external device 804 determines the time duration since the last assessment of the communications link. To this end, the external device 804 may note the present time and compare it to a record of the time of completion of the last assessment to determine the time duration since the last assessment of the communications link. At block 904, the external device 804 determines if the time duration since the last assessment of the communications link exceeds a threshold time duration. Typically, the threshold time duration between assessments is a function of the amount of time it takes to perform an assessment. For example, the total time to perform a communications link assessment may be about 10 microseconds. In this case, the external device 804 may be programmed to assess the communication link several times, e.g., 5 to 10 times, a second. Accordingly, the threshold time duration may be between 0.10 seconds and 0.20 seconds.

Continuing with block 904, if the time since last assessment of the communications link does not exceed the time duration threshold, the external device 804 returns to block 904 and essentially loops through block 904 until the threshold is exceeded. If the time since last assessment of the communications link exceeds the time duration threshold, then at block 906, the external device 804 determines a minimum power of a transmit power range. The transmit power range is a power range within which the transmit power level is set in order to maintain the communications link. The transmit power range is bounded by the minimum power, which defines the lowest power in the range, and a maximum power range, which defines the highest power in the range. At block 908, the external device 804 determines the maximum power of the transmit power range. At block 910, the external device 804 sets the transmit power level for signals to be transmitted from the external device to the implantable device 802 to a preferred power level within the transmit power range.

Figure 10:
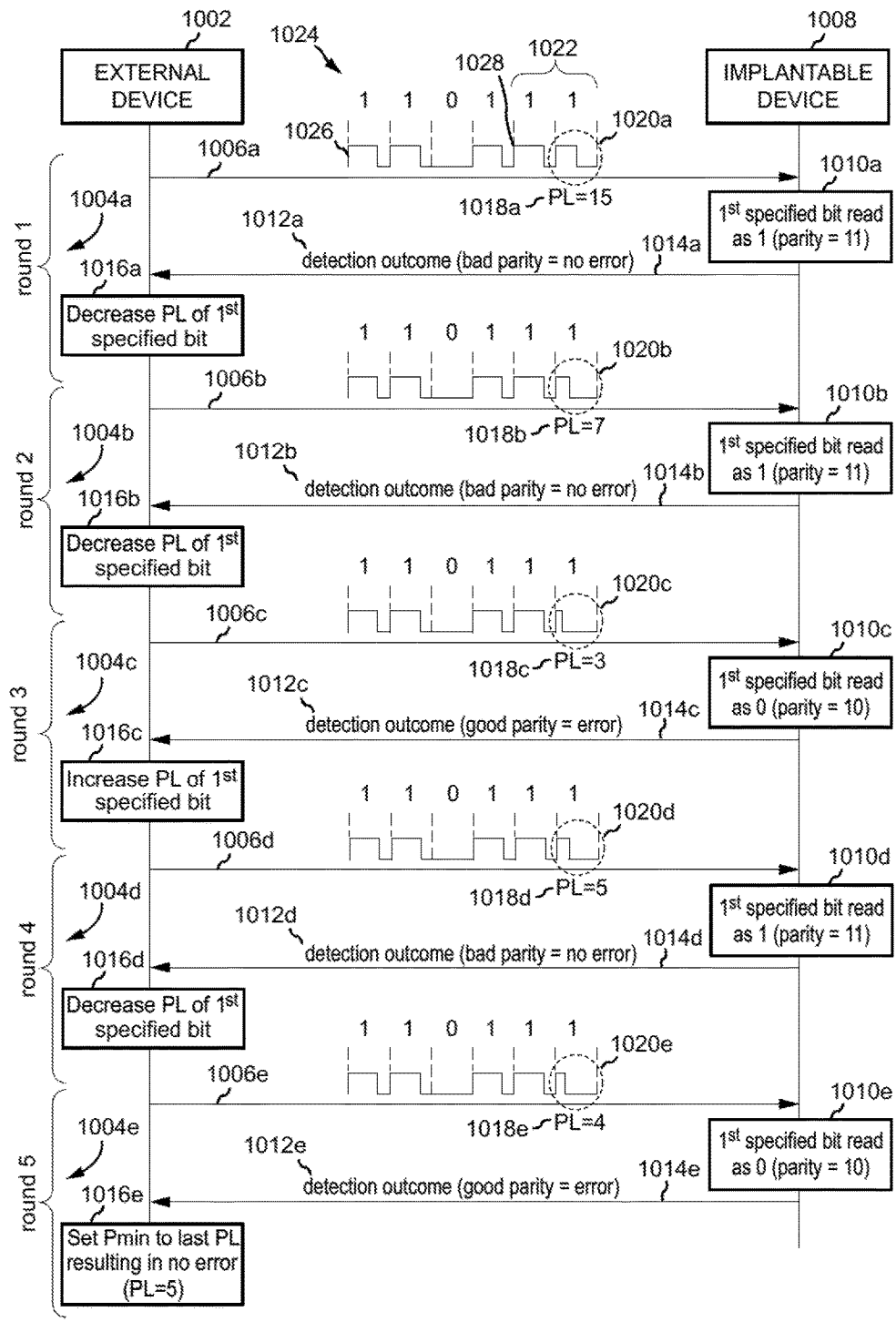
FIG. 10 is a diagram of a series of transmit power adjustment rounds between a first communication interface (e.g., an external device) and a second communication interface (e.g., an implantable medical device) that determine a minimum transmit power.

Returning to block 906, and with additional reference to FIG. 10, to determine the minimum power of a transmit power range, the external device 1002 may perform one or more rounds 1004a through 1004e of power level adjustments. It is noted that in FIG. 10, each power adjustment round is separately identified by reference 1004 appended with a letter "a" through "e." However, for ease in describing the process illustrated in FIG. 10, the power adjustment rounds may be collectively identified by reference 1004. The same applies to other elements identified in FIG. 10, including signal transmissions 1006a through 1006e, readings 1010a through 1010e, minimum power detection outcomes 1012a through 1012e, minimum power detection outcome transmissions 1014a through 1014e, and power level adjustments 1016a through 1016e, each of which may respectively be collectively identified by reference 1006, 1010, 1012, 1014, or 1016.

Continuing with FIG. 10, each adjustment round 1004 includes a signal transmission 1006 from the external device 1002 to the implantable device 1008, a reading 1010 of the signal by the implantable device that determines a minimum power detection outcome 1012, reception by the external device of a minimum power detection outcome transmission 1014 from the implantable device, and a power level adjustment 1016 by the external device based on the minimum power detection outcome.

With respect to adjustments of power level for purposes of determining the minimum power level, the external device 1002 incrementally adjusts a power level 1018 at which a first specified bit 1020 is transmitted from the external device to the implantable device 1008. The first specified bit 1020 may be a bit that will cause the implantable device 1008 to output different detection outcomes 1012 depending on whether the value of the first specified bit as read or decoded by the implantable device matches the value of the first specified bit as transmitted by the external device 1002. For example, the implantable device 1008 may output a first detection outcome 1012 that corresponds to an "error" when the value of the first specified bit 1010 as read or decoded by the implantable device does not match the value of the first specified bit 1020 as transmitted by the external device 1002. Conversely, the implantable device 1008 may output a second detection outcome 1012 that corresponds to "no error" when the value of the first specified bit as read or decoded by the implantable device 1008 matches the value of the first specified bit 1020 as transmitted by the external device 1002.

In an example implementation, the first specified bit 1020 is part of a pair of parity bits 1022. The parity bits 1022 may be included in a header portion 1024 or command frame of a data packet that includes the command frame and a data portion (not shown). The command frame 1024 shown in FIG. 10 is configured with six bits. From left to right, the first bit functions as a wake-up bit for the implantable device 1008. The second bit functions as a command bit that indicates the number of bits in the data portion of the packet. The third bit and fourth bit function as command bits. For example, these bits may serve a "Buffer Ready" command that asks the implantable device if it is ready to receive data from the external device. These command bits may also request that the implantable device transmit its current data buffer to the external device, or retransmit the data if it was not correctly received by the external device. The fifth bit and sixth bit function as parity bits 1022 which indicate whether there are an odd number of bits in the packet or an even number of bits in the packet. In one implementation, the four possible bit combinations of the parity bits 1022 are predetermined to indicate the following:

00=bad parity
01=odd number of bits in the packet (good parity)
10=even number of bits in the packet (good parity)
11=bad parity.

Using these same possible combinations, the power level 1018 of the first specified bit 1020 of the parity bits 1022 may be adjusted to see how the implantable device 1008 responds by way of detection outcomes 1012. To this end, as shown in the adjustment rounds 1004 of FIG. 10, parity bits 1022 having a parity value '11' are transmitted by the external device 1002 in each of the five rounds 1004. The first bit 1028 of the parity bits 1022 is transmitted at a power level that ensures decoding of that bit as a '1' bit by the implantable device 1008. The second bit of the parity bits 1022 is transmitted at different power levels in each round 1004 to cause decoding of the bit as either of a '0' bit or a '1' bit by the implantable device 1008. Because the first bit 1028 is always a '1' bit, the parity bits 1022 may be decoded by the implantable device 1008 as only two of the possible four combinations listed above. These combinations being either of '10' or '11.'

Because the number of bits in a data packet must be either even or odd, the implantable device 1008 expects to receive a parity value '10'. Upon receiving the parity bits 1022 the implantable device 1008 decodes them. If the parity bits are decoded as '11' the implantable device outputs a "bad parity" detection outcome 1012$a$, 1012$b$, 1012$d$. If the parity bits are decoded as '10' the implantable device outputs a "good parity" detection outcome 1012$c$, 1012$e$.

The external device 1002 receives the minimum power detection outcomes 1012 from the implantable device 1008 and interprets the detection outcomes as follows: i) a "bad parity" detection outcome corresponds to a "no error" detection outcome because the parity value '11' as decoded by the implantable device does match the parity value '11' as transmitted by the external device; and ii) a "good parity" detection outcome corresponds to an "error" detection outcome because the parity value '10' as decoded by the implantable device does not match the parity value '11' as transmitted by the external device. The power level 1018 of the first specified bit 1020 (which is the second bit in the set of parity bits 1022) is adjusted upward or downward based on the detection outcomes 1012. For example, in the first, second, and fourth rounds 1004$a$, 1004$b$, 1004$d$, the power levels are decreased 1016$a$, 1016$b$, 1016$d$ in response to a "no error" detection outcome. In the third and fifth rounds 1004$c$, 1004$e$, the power levels are increased 1016$c$, 1016$e$ in response to an "error" detection outcome.

Adjustments in the transmit power level of the first specified bit 1020 may be accomplished by increasing or decreasing the energy of the pulse corresponding to the first specified bit 1020. In the case of an external device 1002 corresponding to a wand, a transmit power level may be adjusted by controlling the duration of time that the transmit coil of the external device is energized.

The waveforms 1026 shown in FIG. 10 represent a series of energizing times used to generate a transmitted signal such as shown in FIG. 6. The duration of the energizing may be referred to as a "pulse width." Thus, the widths of the pulses in the waveform 1026 reflects the amount of time a coil is energized. A pulse width may be described in terms of "counts", where a count corresponds to a unit of time. For example, a count may correspond to 250 nanoseconds. Thus, a pulse width having a count of four translates to a 1 microsecond energizing time for a transmit coil. A pulse width is typically on the order of 1-10 microseconds. In the example of FIG. 10, the pulse widths may have counts ranging from 1 count to 30 counts. The pulse width is linearly related to power level, such that an eight count (2 microsecond) pulse width is half the power of a sixteen count (4 microsecond) pulse width.

With respect to round one 1004$a$ of the minimum power level adjustments shown in FIG. 10, when the minimum power detection outcome 1012$a$ indicates bad parity, which equals "no error", (i.e., the value of the first specified bit 1010$a$ as read or decoded by the implantable device matches the value of the first specified bit 1018$a$ as transmitted by the external device 1002), the present power level 1018$a$ at which the present instance of the first specified bit 1020$a$ was transmitted is decreased 1016$a$ to obtain a next power level 1018$b$ at which to transmit a next instance of the first specified bit 1020$b$. Here, the power level is decreased by decreasing the pulse width by a factor of about one-half, from 15 counts to 7 counts. Other amounts of decrease are possible. For example, the process may decrease by 1 count from 15 counts to 14 counts. Decreasing by a larger factor, such as a factor of one-half, is more efficient in that doing so likely reduces the total number of rounds taken to arrive at the minimum power level.

As noted above, the count value may range from 1 count to 30 counts. When determining a minimum power level, the process may begin at the midway point of 15 counts and adjust the power level downward to arrive at a minimum power level within the lower half of the 1 to 30 count range, e.g., between 1 to 15 counts. Such a downward progression is described immediately below. Later below, when determining a maximum power level, the process may begin just above the midway point, e.g., at 16 counts, and adjust the power level upward to arrive at a minimum power level within the upper half of the 1 to 30 count range, e.g., between 16 to 30 counts.

With respect to round two 1004$b$ of the minimum power level adjustments, when the minimum power detection outcome 1012$b$ indicates bad parity, which equals "no error", (i.e., the value of the first specified bit as read or decoded by the implantable device 1010$b$ matches the value of the first specified bit 1018$b$ as transmitted by the external device 1002), the present power level 1018$b$ at which the present instance of the first specified bit 1020$b$ was transmitted is decreased 1016$b$ to obtain a next power level 1018$c$ at which to transmit a next instance of the first specified bit 1020$c$. Here, the power level is decreased by decreasing the pulse width by about a factor of one-half from 7 counts to 3 counts.

With respect to round three 1004$c$, when the minimum power detection outcome 1012$c$ indicates good parity, which equals "error" (i.e., the value of the first specified bit as read or decoded by the implantable device 1010$c$ does not match the value of the first specified bit 1018$c$ as transmitted by the external device 1002), the present power level 1018$c$ at which the present instance of the first specified bit 1020$c$ was transmitted is increased 1016$c$ to obtain a next power level 1018$d$ at which to transmit a next instance of the first specified bit 1020$d$. Here, the power level is increased by increasing the pulse width by a factor of about one-half, from 3 counts to 5 counts.

With respect to round four 1004$d$ of the minimum power level adjustments, when the minimum power detection outcome 1012$d$ indicates bad parity, which equals "no error" (i.e., the value of the first specified bit as read or decoded by the implantable device 1010$d$ matches the value of the first specified bit 1018$d$ as transmitted by the external device 1002), the present power level 1018$d$ at which the present instance of the first specified bit 1020$d$ was transmitted is decreased 1016$d$ to obtain a next power level 1018$e$ at which to transmit a next instance of the first specified bit 1020$b$. Here, the power level is decreased by decreasing the pulse width from 5 counts to 4 counts.

With respect to round five 1004$e$, when the minimum power detection outcome 1012$e$ indicates good parity, which equals "error" (i.e., the value of the first specified bit as read or decoded by the implantable device 1010$e$ does not match the value of the first specified bit 1018$e$ as transmitted by the external device 1002), no further rounds are performed and the minimum transmit power level is set to the last power level that resulted in "no error" 1016$e$. The minimum transmit power level is set to the last power level that resulted in "no error", which in this case is PL=5, as opposed to the last adjusted power level PL=4, because the last adjusted power level resulted in an error and thus is not a power level at which the first communication interface can reliably transmit signals to the second communication interface.

In this example, it is noted that a sixth power adjustment round is not performed because an increase in the power level 1018e would return the pulse width to 5, which was the value used in round four, and would simply result in a repeat of round four. Accordingly, the minimum power level determination process is terminated, in this case, when continuation of the process becomes repetitive or would result in a ping-pong effect where the adjusted power levels bounce back and forth between two values, e.g., PL=5 and PL=4.

The minimum power level determination process may be terminated under other conditions. For example, the process may be terminated upon an occurrence of a particular pattern in a set of minimum detection outcomes. The particular pattern may be programmed into the first communication interface. A particular pattern in a set of detection outcomes may be a "no error" outcome, followed by an "error" outcome, followed by a "no error" outcome. An instance of this pattern is represented in rounds 2, 3, and 4 of FIG. 10. Another particular pattern in a set of detection outcomes may be an "error" outcome, followed by a "no error" outcome, followed by an "error" outcome. An instance of this pattern is represented in rounds 3, 4, and 5 of FIG. 10. These patterns represent conditions where adjustments in power levels toggle back and forth between decreases in power level and increases in power level to settle in on a final minimum transmit power level. In either case, the final minimum transmit power level is selected to be the lowest power level in the set of power levels that resulted in a detection outcome of "no error."

The minimum power level determination process may also be terminated upon expiration of a minimum power determination time period. As previously described above with reference to FIG. 9, a communication link assessment—which includes the steps of determining a minimum power level, determining a maximum power level, and setting the power level to value between minimum and maximum—is performed periodically and may take up to a maximum amount of time to complete. The maximum amount of time to complete is shared between the portion of the assessment that determines the minimum power level and the portion of the assessment that determines the maximum power level. The relationship between the maximum amount of time and the respective minimum and maximum power level determination portions may be expressed as:

$$T_{minPL} + T_{maxPL} \leq T_{MAX}$$

where: $T_{minPL}$=minimum power determination time period $T_{maxPL}$=maximum power determination time period $T_{MAX}$=maximum amount of time The maximum amount of time to complete an assessment may be programmed into the first communication interface and may be set to a duration of time that does not unduly interrupt communication between the first communication interface and the second communication interface. This may be accomplished by having a communication interval between assessments that is significantly larger than the maximum amount of time to complete an assessment. For example, as previously described with reference to FIG. 9, a periodic assessment may be programmed to occur every 0.10 seconds or 0.20 seconds for a maximum amount of time ($T_{MAX}$) of about 10 microseconds. The 0.10 second or 0.20 second period of time corresponds to communication intervals during which the first communication interface and the second communication interface communicate, and is significantly larger than the 10-microsecond time it takes to perform an assessment. In the case of a 0.10 second communication interval, the interval is 10000 times larger than the 10-microsecond maximum amount of time ($T_{MAX}$). In the case of a 0.20 second communication interval, the interval is 20000 times larger than the 10-microsecond maximum amount of time ($T_{MAX}$).

The first communication interface may be programmed to allot a portion of the maximum amount of time ($T_{MAX}$) to determining the minimum power level and another portion to determining the maximum power level. In one configuration, the allotment may be an even division of the maximum amount of time ($T_{MAX}$). In this case, each of the minimum power determination time period ($T_{minPL}$) and the maximum power determination time period ($T_{minPL}$) would be one-half of the maximum amount of time ($T_{MAX}$).

In another configuration, the allotment may be based on a reminder of time of the maximum amount of time ($T_{MAX}$). Here, the time allotted to either of the minimum power determination time period ($T_{minPL}$) or the maximum power determination time period ($T_{maxPL}$) is dependent on the amount of time already used to perform the other of the minimum power determination or the maximum power determination. For example, if the maximum amount of time ($T_{MAX}$) is 10 microseconds, and the amount of time to perform the minimum power determination ($T_{minPL}$) is 4 microseconds, then the amount of time allotted to performance of the minimum power determination ($T_{maxPL}$) is $T_{MAX} - T_{minPL}$, which in this example is 6 microseconds. In order to ensure a portion of the maximum amount of time ($T_{MAX}$) is available for the latter of the minimum power determination or the maximum power determination processes, a limit or cap may be placed on the amount of time allotted to the initial process. For example, if the maximum amount of time ($T_{MAX}$) is 10 microseconds, a time cap of 6 microseconds may be placed on the initial power determination process so that at least 4 microseconds remain for performance of the latter power determination process.

The minimum power level determination process may also be terminated upon an occurrence of consecutive adjusted power levels that are within a threshold value of each other. This termination event is beneficial in that it may prevent unnecessary rounds of power level adjusting, thus reducing the time taken to determine the minimum transmit power level and conserving energy. The threshold value may be programmed into the first communication interface, and may be a value that represents a closeness in the values of consecutive adjusted power levels that warrants no further adjustment in the power level. In other words, the consecutive power levels are so close to each other that the power level needs no further adjusting.

Consecutive adjusted power levels include power levels that are processed one after the other, in consecutive processing rounds. For example, with reference to FIG. 10, adjusted power level PL=7 in processing round two is consecutive with respect to adjusted power level PL=3 in processing round three. Likewise, adjusted power level PL=3 in processing round three is consecutive with respect to adjusted power level PL=5 in processing round four, whereas adjusted power level PL=5 in processing round 4 is consecutive with respect to adjusted power level PL=4 in processing round five.

Continuing with the example in FIG. 10, in one implementation, the threshold value may be set to two, in which case the power level adjusting would stop after round four when the difference between consecutive adjusted power levels PL=3 (from round three) and PL=5 (from round four) is two, and the minimum power level would be set to PL=5. In another implementation, the threshold value may be set to one, in which case the power level adjusting would stop after round five when the difference between consecutive adjusted power levels PL=5 (from round four) and PL=4 (from round five) is one, and the minimum power level would be set to PL=5.

Note that in each example implementation above, the minimum power level is set to PL=5 because PL=5 was the power level of the pair of consecutive power levels that resulted in a minimum power detection outcome of "no error." Accordingly, while the threshold value determines when to terminate further adjusting of power levels, selection of the minimum power level from the pair of consecutive adjusted power levels is based on the detection outcome associated with each of the adjusted power levels. In cases where one of the consecutive adjusted power levels results in a detection outcome of "error" and the other results in a detection outcome of "no error," the adjusted power level that results in a detection outcome of "no error" is selected as the minimum transmit power level. In cases where each of the consecutive adjusted power levels results in a detection outcome of "no error," the lesser of the adjusted power levels is selected as the minimum transmit power level. In cases where each of the consecutive adjusted power levels results in a detection outcome of "error," termination of the minimum transmit power level determination process would be bypassed and additional rounds of power level adjustments would occur.

Figure 11:
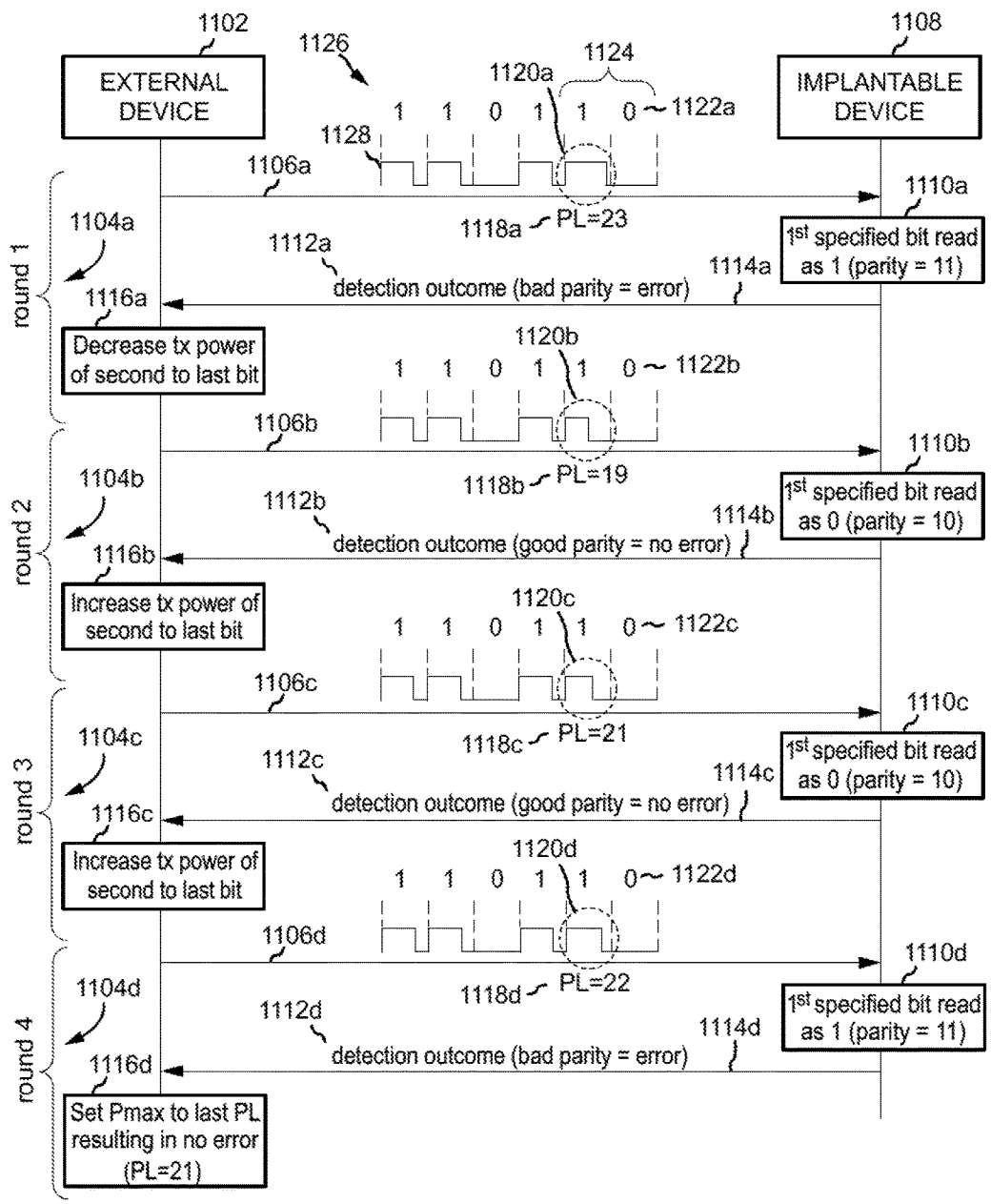
FIG. 11 is a diagram of a series of transmit power adjustment rounds between a first communication interface (e.g., an external device) and a second communication interface (e.g., an implantable medical device) that determine a maximum transmit power.

Returning to block 908, and with additional reference to FIG. 11, to determine the maximum power of a transmit power range, the external device 1102 may perform several rounds 1104*a* through 1104*d* of power level adjustments. It is noted that in FIG. 11, each power adjustment round is separately identified by reference 1104 appended with a letter "a" through "d." However, for ease in describing the process illustrated in FIG. 11, the power adjustment rounds may be collectively identified by reference 1104. The same applies to other elements identified in FIG. 11, including signal transmissions 1106*a* through 1106*d*, readings 1110*a* through 1110*d*, maximum power detection outcomes 1112*a* through 1112*d*, detection outcome transmissions 1114*a* through 1114*d*, and power level adjustments 1116*a* through 1116*d*, each of which may respectively be collectively identified by reference 1106, 1110, 1112, 1114, or 1116.

Continuing with FIG. 11, each adjustment round 1104 includes a signal transmission 1106 from the external device 1102 to the implantable device 1108, a reading 1110 of the signal by the implantable device that determines a maximum power detection outcome 1112, reception by the external device of a detection outcome transmission 1114 from the implantable device, and a power level adjustment 1116 by the external device based on the maximum power detection outcome.

With respect to adjustments of power level for purposes of determining the maximum power level, the external device 1102 incrementally adjusts a power level 1118 at which a second specified bit 1120 is transmitted from the external device to the implantable device 1108. The second specified bit 1120 may be a bit that will cause the implantable device 1108 to output different maximum power detection outcomes 1112 depending on whether the value of a bit 1122 adjacent the second specified bit 1120 as read or decoded by the implantable device matches the value of the adjacent bit 1122 as transmitted by the external device 1102. For example, the implantable device 1108 may output a third detection outcome 1112 that corresponds to an "error" when the value of the bit adjacent the second specified bit as read or decoded by the implantable device 1110 does not match the value of the adjacent bit 1122 as transmitted by the external device 1102. Conversely, the implantable device 1108 may output a fourth detection outcome 1112 that corresponds to "no error" when the value of the bit adjacent the second specified bit as read or decoded by the implantable device 1110 matches the value of the first specified bit 1120 as transmitted by the external device 1102.

In an example implementation, the second specified bit 1120 is part of a pair of parity bits 1124. The parity bits 1124 may be included in a header portion 1126 or command frame of a data packet that includes the command frame and a data portion (not shown). Like the command bit described above with reference to FIG. 10, the command frame 1126 shown in FIG. 11 is configured with six bits. The fifth bit and sixth bit function as parity bits 1124 which indicate whether there are an odd number of bits in the packet or an even number of bits in the packet. In one implementation, the four possible bit combinations of the parity bits 1124 are predetermined to indicate the following:

00=bad parity
01=odd number of bits in the packet (good parity)
10=even number of bits in the packet (good parity)
11=bad parity Using these same possible combinations, the power level of the second specified bit 1120 of the parity bits 1022 may be adjusted to see how the implantable device responds by way of detection outcomes 1112. To this end, as shown in the adjustment rounds 1104 of FIG. 11, a set of parity bits 1124 having a parity value '10' are transmitted by the external device 1102 in each of the four rounds 1104. The first bit 1122 of the parity bits 1124 is transmitted at a power level that ensures decoding of the bit as a '0' bit by the implantable device 1008. The power level of the second bit 1120, however, is transmitted at different power levels in each round 1104 to cause decoding of the first bit 1122 as either of a '0' bit or a '1' bit by the implantable device 1108. Because the second bit 1120 is always a '1' bit, the parity bits 1124 may be decoded by the implantable device 1108 as only two of the possible four combinations listed above. These combinations being either of '10' or '11.'

Because the number of bits in a data packet must be either even or odd, the implantable device 1108, expects to receive a parity value '10'. Upon receiving the parity bits 1124 the implantable device 1108 decodes them. If the parity bits 1124 are decoded as '10' the implantable device outputs a "no error" detection outcome 1112*b*, 1112*c*. If the parity bits 1124 are decoded as '11' the implantable device outputs an "error" detection outcome 1112*a*, 1112*d*.

The external device 1102 receives the maximum power detection outcomes 1112 from the implantable device 1108 and interprets the maximum power detection outcomes as follows: i) a "bad parity" detection outcome corresponds to an "error" detection outcome because the parity value '11' as decoded by the implantable device does not match the parity value '10' as transmitted by the external device; and ii) a "good parity" detection outcome corresponds to a "no error" detection outcome because the parity value '10' as decoded by the implantable device does match the parity value '10' as transmitted by the external device. The power level 1118 of the second specified bit 1120 (which is the first bit in the set of parity bits 1124) is adjusted upward or downward based on the maximum power detection outcomes 1112. For example, in the first round 1104a the power level is decreased 1116a. In the second and third rounds 1104b, 1104c, the power levels are increased 1116b, 1116c.

Adjustments in the transmit power level of the second specified bit 1120 may be accomplished by increasing or decreasing the energy of the signal pulse corresponding to the second specified bit 1120. In the case of an external device 1102 corresponding to a wand, a transmit power level may be adjusted by controlling the duration of time that the transmit coil of the external device is energized.

The waveforms 1128 shown in FIG. 11 represent a series of energizing times used to generate a transmitted signal such as shown in FIG. 6. As previously described, the duration of the energizing may be referred to as a "pulse width." A pulse width may be described in terms of "counts", where a count corresponds to a unit of time. For example, a count may correspond to 250 nanoseconds. Thus, a pulse width having a count of four translates to a 1 microsecond energizing time for a transmit coil. A pulse width is typically on the order of 1-10 microseconds. In the example of FIG. 11, the pulse widths may have counts ranging from 1 count to 30 counts. The pulse width is linearly related to power level, such that an eight count (2 microsecond) pulse width is half the power of a sixteen count (4 microsecond) pulse width.

With respect to round one 1104a of the maximum power level adjustments shown in FIG. 11, when the maximum power detection outcome 1112a indicates bad parity, which equals an "error" (i.e., the value of the bit adjacent the second specified bit 1110a as read or decoded by the implantable device matches the value of the adjacent bit 1122a as transmitted by the external device 1102), the present power level 1118a at which the present instance of the second specified bit 1120a was transmitted is decreased 1116a to obtain a next power level 1118b at which to transmit a next instance of the second specified bit 1120b. Here, the power level is decreased by decreasing the pulse width from 23 counts to 19 counts. Other amounts of decrease are possible. For example, the process may decrease by 1 count from 23 counts to 22 counts. Decreasing by a larger factor, such as a factor of one-half, is more efficient in that doing so likely reduces the total number of rounds taken to arrive at the minimum power level.

As described previously, the power level may be between 1 to 30 counts, and when determining the maximum power level, the process adjusts the power level within the upper range of the of counts, e.g., between 16 to 30 counts. In the example of FIG. 11, the process begins at a power level of 23 counts, which is about one-half between the upper range of 16 to 30 counts.

With respect to round two 1104b, when the maximum power detection outcome 1112b indicates good parity, which equals "no error" (i.e., the value of the bit adjacent the second specified bit as read or decoded by the implantable device 1110b matched the value of the bit adjacent 1122b the second specified bit 1120b as transmitted by the external device 1102), the present power level 1118b at which the present instance of the second specified bit 1120b was transmitted is increased 1116b to obtain a next power level 1118c at which to transmit a next instance of the second specified bit 1120c. Here, the power level is increased by increasing the pulse width from 19 counts to 21 counts.

With respect to round three 1104c, when the maximum power detection outcome 1112c indicates good parity, which equals "no error" (i.e., the value of the bit adjacent the second specified bit as read or decoded by the implantable device 1110c matched the value of the bit adjacent 1122c the second specified bit 1120c as transmitted by the external device 1102), the present power level 1118c at which the present instance of the second specified bit 1120c was transmitted is increased 1116c to obtain a next power level 1118d at which to transmit a next instance of the second specified bit 1120d. Here, the power level is increased by increasing the pulse width from 21 counts to 22 counts.

With respect to round four 1104d, when the maximum power detection outcome 1112d indicates bad parity, which equals "error" (i.e., the value of the bit adjacent the second specified bit as read or decoded by the implantable device 1110d did not match the value of the bit adjacent 1122d the second specified bit 1120d as transmitted by the external device 1102), the maximum power level is set to the last power level resulting in "no error" 1116d.

In this example, it is noted that another power adjustment round is not performed because a decrease in the power level 1118d would return the pulse width to PL=21, which was the value used in round three, and would simply result in a repeat of round three. Accordingly, the maximum power level determination process is terminated, in this case, when continuation of the process becomes repetitive or would result in a ping-pong effect where the adjusted power levels bounce back and forth between two values, e.g., PL=21 and PL=22.

Similar to the minimum power level determination, the maximum power level determination process may be terminated under other conditions. For example, the process may be terminated upon an occurrence of a particular pattern in a set of maximum power detection outcomes. A particular pattern in a set of detection outcomes may be an "error" outcome, followed by one or more "no error" outcomes. An instance of this pattern is represented in rounds 1, 2, and 3 of FIG. 11. Another particular pattern in a set of detection outcomes may be one or more "no error" outcomes, followed by an "error" outcome. An instance of this pattern is represented in rounds 2, 3, and 4 of FIG. 11. These patterns represent conditions wherein changes in the power level steadily increase to settle in on a final maximum transmit power level. In either case, the final maximum transmit power level is selected to be the lowest power level in the set of power levels that resulted in a detection outcome of "no error."

The maximum power level determination process may also be terminated upon expiration of a maximum power determination time period. As previously described above with respect to the minimum power determination process, a communication link assessment is performed periodically and may take up to a maximum amount of time ($T_{MAX}$) to complete. The maximum amount of time ($T_{MAX}$) to complete is shared between the portion of the assessment that determines the minimum power level and the portion of the assessment that determines the maximum power level. As described above, the maximum amount of time ($T_{MAX}$) may be equally divided between the minimum power determination time period ($T_{minPL}$) and the maximum power determination time period ($T_{minPL}$), or the maximum amount of time ($T_{MAX}$) may be allotted based on a reminder of time of the maximum amount of time ($T_{MAX}$) after initial power determination processing.

The maximum power level determination process may also be terminated upon an occurrence of consecutive adjusted power levels that are within a threshold value of each other. As noted above, this termination event is beneficial in that it may prevent unnecessary rounds of power level adjusting, thus reducing the time taken to determine the minimum transmit power level and conserving energy. The threshold value may be programmed into the first communication interface, and may be a value that represents a closeness between consecutive adjusted power levels that warrants no further adjustment in the power level.

As noted above, consecutive adjusted power levels include power levels that are processed one after the other, in consecutive processing rounds. For example, with reference to FIG. 11, adjusted power level PL=19 in processing round two is consecutive with respect to adjusted power level PL=21 in processing round three. Likewise, adjusted power level PL=21 in processing round three is consecutive with respect to adjusted power level PL=22 in processing round four.

Continuing with the example in FIG. 11, in one implementation, the threshold value may be set to two, in which case the power level adjusting would stop after round three when the difference between consecutive adjusted power levels PL=19 (from round two) and PL=21 (from round three) is two, and the maximum power level would be set to PL=21. In another implementation, the threshold value may be set to one, in which case the power level adjusting would stop after round four when the difference between consecutive adjusted power levels PL=21 (from round three) and PL=22 (from round four) is one, and the maximum power level would be set to PL=21.

Note that in each example implementation above, the maximum power level is set to PL=21 because PL=21 was the power level of the pair of consecutive power levels that resulted in a maximum power detection outcome of "no error." Accordingly, while the threshold value determines when to terminate further adjusting of power levels, selection of the maximum power level from the pair of consecutive adjusted power levels is based on the detection outcome associated with each of the adjusted power levels. In cases where one of the consecutive adjusted power levels results in a detection outcome of "error" and the other results in a detection outcome of "no error," the adjusted power level that results in a detection outcome of "no error" is selected as the maximum transmit power level. In cases where each of the consecutive adjusted power levels results in a detection outcome of "no error," the lesser of the adjusted power levels is selected as the maximum transmit power level. In cases where each of the consecutive adjusted power levels results in a detection outcome of "error," termination of the maximum transmit power level determination process would be bypassed and additional rounds of power level adjustments would occur.

Other Communication Schemes

The foregoing detailed description discloses a transmit power level determination process within the context of inductive telemetry communication, with power level adjustments being made through adjustments in coil energizing time as quantified by changes in pulse widths. The transmit power level determination process disclosed herein, however, may be applied to other forms of telemetry communication based on, for example, any one of an amplitude modulation communication scheme (e.g., amplitude shift keying), a frequency modulation communication scheme (e.g., frequency shift keying), or a phase modulation communication scheme (e.g., phase shift keying). These communication schemes may be implemented using circuitry within a communication interface of an implantable medical device, as shown in FIG. 3, and the local area communication interface, as shown in FIG. 4. These communication interfaces may include transceivers configured to communicate by RF telemetry and processors configured to adjust transmit power levels of particular bits of digital communication signals, decode digital communication signals, output detection outcomes, and further adjust transmit power levels based on detection outcomes, in a manner similar to the way described above with respect to of FIGS. 10 and 11. RF telemetry communication interfaces may be configured similar to the inductive telemetry communication interfaces of FIG. 5 and may include some of the same communications circuitry, except RF antennas are is used in place of the coils.

Figure 12:
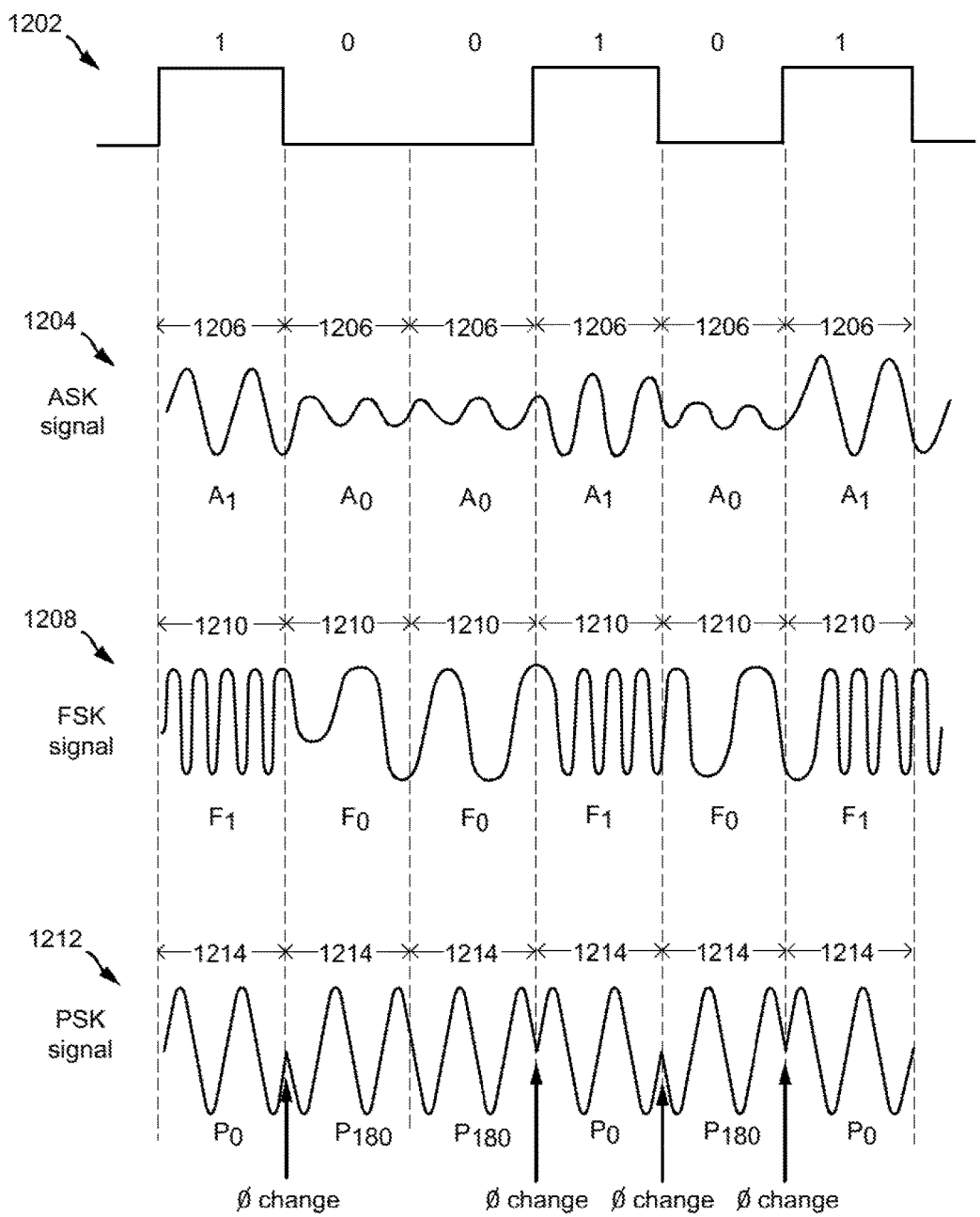
FIG. 12 are schematic representations of different digital communication schemes for conveying a bit pattern.

In an amplitude shift keying (ASK) communication scheme, the amplitude of a transmitted signal may change as a function of unit time to define different bits in a series of bits, wherein each unit time corresponds to a bit. For example, with reference to FIG. 12, a bit pattern 1202 may be conveyed by transmitting an ASK signal 1204. The ASK signal 1204 is divided into a series of time units 1206. Each time unit 1206 corresponds to a bit in the bit pattern 1202 and the amplitude $A_0$ or $A_1$ of the portion of the ASK signal 1204 in a particular time unit defines the bit value. On the receiving end, the ASK signal 1204 is processed on a per time unit 1206 basis by comparing the amplitude of the signal during the time unit to a threshold value. If the amplitude of a time unit 1206 is above the threshold value, the bit associated with that time unit is decoded as a '1' bit, otherwise the bit is decoded as a '0' bit. For example, in the ASK signal shown in FIG. 12, the amplitude $A_1$ of the signal in the first, fourth and sixth time units is above a threshold value. Accordingly, the bits for those time units are decoded as "1." The amplitude $A_0$ of the signal in the second, third and fifth time units below the threshold value. Accordingly, the bits for those time units are decoded as "0."

In another implementation, the amplitudes of the ASK signal may define a symbol, i.e., two or more bits. In this case, the amplitude of the ASK signal in a time unit is compared to three thresholds to decode the symbol. For example, if the amplitude is less than a first threshold, the symbol is decoded as '00,' if the amplitude is greater than the first threshold but less than a second threshold, the symbol is decoded as '01,' if the amplitude is greater than the second threshold but less than a third threshold, the symbol is decoded as '10,' if the amplitude is greater than the third threshold, the symbol is decoded as '11.'

Based on the foregoing, the power adjustment process of FIG. 9 may be implemented in a scenario where a first communication interface and a second communication interface communicate using an ASK communication scheme. To this end, the first communication interface may determine a minimum power level by adjusting, either upward or downward, the amplitude of the portion of an ASK signal corresponding to a first specified bit to thereby cause different detection outcomes, e.g., parity results, on the receiving end, and to make power level adjustments based on the detection outcomes. In this scenario, the first specified bit may be the same as the first specified bit described above with reference to FIG. 10 and the process for determining the minimum power level using ASK signals may include several rounds of upward or downward power level adjustments as shown in FIG. 10. However, the power level adjustments made when using an ASK communication scheme involve amplitude adjustments, as opposed to the coil energizing time adjustments shown in FIG. 10.

The first communication interface may also determine a maximum power level by adjusting, either upward or downward, the amplitude of the portion of an ASK signal corresponding to a second specified bit to thereby cause different detection outcomes, e.g., parity results, on the receiving end, and to make power level adjustments based on the detection outcomes. In this scenario, the second specified bit may be the same as the second specified bit described above with reference to FIG. 11 and the process for determining the maximum power level using ASK signals may include several rounds of upward or downward power level adjustments as shown in FIG. 11. Again, the power level adjustments made when using an ASK communication scheme involve amplitude adjustments, as opposed to the coil energizing time adjustments shown in FIG. 11.

In frequency shift keying (FSK) communication scheme, the frequency of a transmitted signal may change as a function of unit time to thereby define different bits in a series of bits, wherein each bit corresponds to a unit of time. For example, with reference to FIG. 12, a bit pattern 1202 may be conveyed by transmitting a FSK signal 1208. The FSK signal 1208 is divided into a series of time units 1210. Each time unit 1210 corresponds to a bit in the bit pattern 1202 and the frequency $F_0$ or $F_1$ of the portion of the FSK signal 1208 in a particular time unit defines the bit value. On the receiving end, the FSK signal 1208 is processed on a per time unit 1210 basis by comparing the frequency of the signal during the time unit to a threshold value. If the frequency of a time unit 1210 is above the threshold value, the bit associated with that time unit is decoded as a '1' bit, otherwise the bit is decoded as a '0' bit. For example, in the FSK signal shown in FIG. 12, the frequency $F_1$ of the signal in the first, fourth and sixth time units is above a threshold value. Accordingly, the bits for those time units are decoded as "1." The frequency $F_0$ of the signal in the second, third and fifth time units below the threshold value. Accordingly, the bits for those time units are decoded as "0."

In another implementation, the frequencies of the FSK signal may define a symbol, i.e., two or more bits. In this case, the frequency of the signal in a time unit is compared to three frequency thresholds to decode the symbol. For example, if the frequency is less than a first frequency threshold, the symbol is decoded as '00,' if the frequency is greater than the first frequency threshold but less than a second frequency threshold, the symbol is decoded as '01,' if the frequency is greater than the second frequency threshold but less than a third frequency threshold, the symbol is decoded as '10,' if the frequency is greater than the third frequency threshold, the symbol is decoded as '11.'

Based on the foregoing, the power adjustment process of FIG. 9 may be implemented in a scenario where a first communication interface and a second communication interface communicate using a FSK communication scheme. To this end, the first communication interface may determine a minimum power level by adjusting, either upward or downward, the frequency of the portion of a FSK signal corresponding to a first specified bit to thereby cause different detection outcomes, e.g., parity results, on the receiving end, and to make power level adjustments based on the detection outcomes. In this scenario, the first specified bit may be the same as the first specified bit described above with reference to FIG. 10 and the process for determining the minimum power level using FSK signals may include several rounds of upward or downward power level adjustments as shown in FIG. 10. However, the power level adjustments made when using an FSK communication scheme may involve amplitude and/or frequency adjustments, as opposed to the coil energizing time adjustments shown in FIG. 10.

The first communication interface may also determine a maximum power level by adjusting, either upward or downward, the frequency of the portion of a FSK signal corresponding to a second specified bit to thereby cause different detection outcomes, e.g., parity results, on the receiving end, and to make power level adjustments based on the detection outcomes. In this scenario, the second specified bit may be the same as the second specified bit described above with reference to FIG. 11 and the process for determining the maximum power level using FSK signals may include several rounds of upward or downward power level adjustments as shown in FIG. 11. Again, the power level adjustments made when using an FSK communication scheme may involve amplitude and/or frequency adjustments, as opposed to the coil energizing time adjustments shown in FIG. 11.

In phase shift keying (PSK) communication scheme, the phase of a transmitted signal may change as a function of unit time to thereby define different bits in a series of bits, wherein each bit corresponds to a unit of time. For example, with reference to FIG. 12, a bit pattern 1202 may be conveyed by transmitting a PSK signal 1212. The PSK signal 1212 is divided into a series of time units 1214. Each time unit 1214 corresponds to a bit in the bit pattern 1202 and a change in phase in the portion of the PSK signal 1212 within a time unit 1214 relative to the phase of a reference signal defines the bit value for the time unit. On the receiving end, the PSK signal 1212 is processed on a time unit basis by detecting for a phase shift between the phase of the PSK signal and the phase of the reference signal, and assigning a bit value based on the detection outcome. For example, if the phase of the PSK signal in a particular time unit is aligned with the phase of the reference signal, then there is a 0-degree phase shift and the bit value associated with the particular time unit is decoded as a '1' bit. In the PSK signal shown in FIG. 12, the phase shift of the signal in the first, fourth and sixth time units is 0 degrees. Accordingly, the bits for those time units are decoded as "1." If, however, the phase of the PSK signal in a particular time unit is shifted 180 degrees relative to the reference signal, then there is a 180-degree phase shift and the bit value associated with the particular time unit is decoded as a '0' bit. In the PSK signal shown in FIG. 12, the phase shift of the signal in the second, third and fifth time units 180 degrees. Accordingly, the bits for those time units are decoded as "0."

Based on the foregoing, the power adjustment process of FIG. 9 may be implemented in a scenario where a first communication interface and a second communication interface communicate using a PSK communication scheme. To this end, the first communication interface may determine a minimum power level by adjusting, either upward or downward, the phase, amplitude, or frequency of the portion of a PSK signal corresponding to a first specified bit to thereby cause different detection outcomes, e.g., parity results, on the receiving end, and to make power level adjustments based on the detection outcomes. With respect to changes in phase that may introduce errors, in the case where a 180-degree change in phase between a signal and a reference signal maps to a particular bit value, and a 0-degree change in phase maps to another bit value, an error may be introduced, for example, by changing the phase of the PSK signal by ±90 degrees. In this scenario, the first specified bit may be the same as the first specified bit described above with reference to FIG. 10 and the process for determining the minimum power level using PSK signals may include several rounds of upward or downward power level adjustments as shown in FIG. 10. However, the power level adjustments made when using an PSK communication scheme may involve phase, amplitude, or frequency adjustments, as opposed to the coil energizing time adjustments shown in FIG. 10.

The first communication interface may also determine a maximum power level by adjusting, either upward or downward, the frequency of the portion of a PSK signal corresponding to a second specified bit to thereby cause different detection outcomes, e.g., parity results, on the receiving end, and to make power level adjustments based on the detection outcomes. In this scenario, the second specified bit may be the same as the second specified bit described above with reference to FIG. 11 and the process for determining the maximum power level using FSK signals may include several rounds of upward or downward power level adjustments as shown in FIG. 11. Again, the power level adjustments made when using an FSK communication scheme involve phase, amplitude, or frequency adjustments, as opposed to the coil energizing time adjustments shown in FIG. 11.

FINAL SUMMARY

Figure 13:
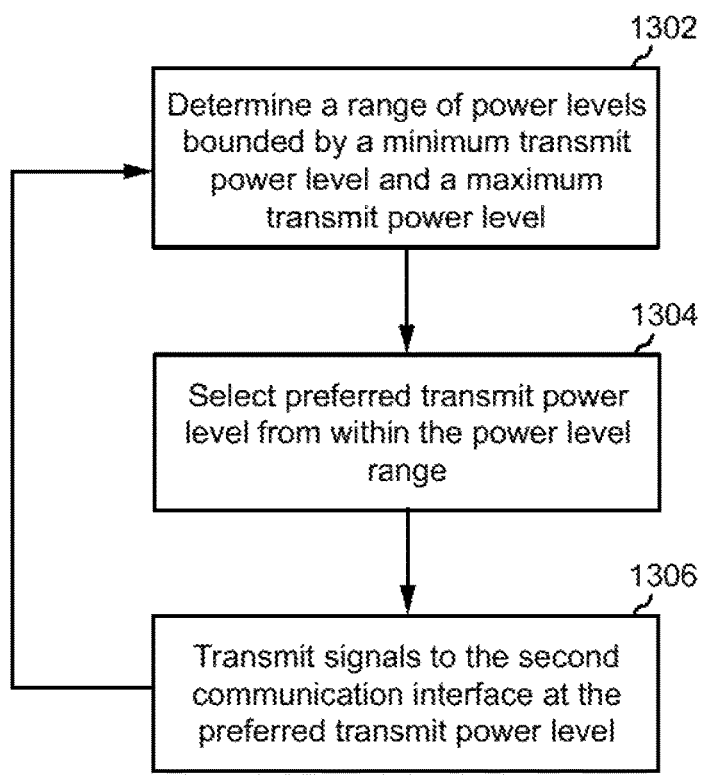
FIG. 13 is a flow chart of another method of adjusting a transmit power level for signals to be transmitted from a first communication interface to a second communication interface.

Disclosed herein are methods and apparatuses for periodically adjusting the power level at which signals are transmitted from a first communication interface to a second communication interface through a communications link. In a method of periodic assessment of a communication link, and with reference to FIG. 13, at block 1302, a range of power levels bounded by a minimum transmit power level and a maximum transmit power level is determined. Each of the minimum transmit power level and the maximum transmit power level is determined by intentionally causing a reception error to occur at the second communication interface. A reception error corresponds to a condition where a signal received by the second communication interface from the first communication interface, and decoded by the second communication interface does not match the signal as transmitted by the first communication interface.

The first communication interface may determine the minimum transmit power level by decreasing the transmit power level of a particular bit in a bit pattern until there is a reception error at the second communication interface. The first communication interface may then increase the transmit power level of the bit until there is no longer a reception error at the second communication interface. The transmit power level of the particular bit may be further adjusted, back and forth between decreases and increases, until a final minimum transmit power level is arrived at.

Regarding the maximum transmit power level, the first communication interface may determine it by increasing the transmit power level of a particular bit in a bit pattern until there is a reception error at the second communication interface. The first communication interface may then decrease the transmit power level of the bit until there is no longer a reception error at the second communication interface. The transmit power level of the particular bit may be further adjusted, back and forth between increases and decreases, until a final maximum transmit power level is arrived at.

At block 1304, once the minimum and maximum transmit power levels are determined, the preferred transmit power level may be selected from within the power level range. For example, the preferred transmit power level may be the mean or median of the minimum and maximum transmit power levels. At block 1306, the first communication interface transmits signals to the second communication interface at the preferred transmit power level. The process may periodically return to block 1302 and repeat the transmit power level adjustment process.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims.

What is claimed is:

1. A method of adjusting a transmit power level for signals to be transmitted from a first communication interface to a second communication interface, the method comprising:
   determining a minimum power of a transmit power range by adjusting a power level at which a first specified bit is transmitted from the first communication interface to the second communication interface, wherein the power level is repeatedly adjusted until a specified event occurs as a result of the repeated adjusting;
   determining a maximum power of the transmit power range by adjusting a power level at which a second specified bit is transmitted from the first communication interface to the second communication interface, wherein the power level is repeatedly adjusted until a specified event occurs as a result of the repeated adjusting; and
   setting the transmit power level for signals to be transmitted from the first communication interface to the second communication interface to a preferred power level within the transmit power range.

2. The method of claim 1, wherein adjusting the power level at which a first specified bit is transmitted comprises:
   increasing a present power level at which a present instance of the first specified bit was transmitted to obtain a next power level at which to transmit a next instance of the first specified bit, when a present minimum power detection outcome corresponds to a first outcome; and
   decreasing a present power level at which a present instance of the first specified bit was transmitted to obtain a next power level at which to transmit a next instance of the first specified bit, when a present minimum power detection outcome corresponds to a second outcome different from the first outcome.

3. The method of claim 2, wherein the first outcome corresponds to an error outcome which indicates that the value of the present instance of the first specified bit as decoded by the second communication interface does not match the value of the present instance of the first specified bit as transmitted by the first communication interface.

4. The method of claim 2, wherein the second outcome corresponds to a no error outcome which indicates that the value of the present instance of the first specified bit as decoded by the second communication interface does match the value of the present instance of the first specified bit as transmitted by the first communication interface.

5. The method of claim 1, wherein adjusting the power level at which a second specified bit is transmitted comprises:
   decreasing a present power level at which a present instance of the second specified bit was transmitted to obtain a next power level at which to transmit a next instance of the second specified bit, when a present maximum power detection outcome corresponds to a third outcome; and increasing a present power level at which a present instance of the second specified bit was transmitted to obtain a next power level at which to transmit a next instance of the second specified bit, when a present maximum power detection outcome corresponds to a fourth outcome different from the third outcome.

6. The method of claim 5, wherein the third outcome corresponds to an error outcome which indicates that the value of a bit adjacent to and after the present instance of the second specified bit, as decoded by the second communication interface does not match the value of the adjacent bit as transmitted by the first communication interface.

7. The method of claim 5, wherein the fourth outcome corresponds to a no error outcome which indicates that the value of a bit adjacent to and after the present instance of the first specified bit, as decoded by the second communication interface does match the value of the adjacent bit as transmitted by the first communication interface.

8. The method of claim 1, wherein the specified event that occurs when determining the minimum power comprises one of the following: 1) an occurrence of a particular pattern in a set of minimum power detection outcomes obtained from the second communication interface, 2) an expiration of a minimum power determination time period, and 3) an occurrence of consecutive adjusted power levels that are within a threshold value of each other.

9. The method of claim 1, wherein the specified event that occurs when determining the maximum power comprises one of the following: 1) an occurrence of a particular pattern in a set of maximum power detection outcomes obtained from the second communication interface, 2) an expiration of a maximum power determination time period, and 3) an occurrence of consecutive adjusted power levels that are within a threshold value of each other.

10. The method of claim 1, wherein the first communication interface and the second communication interface communicate through inductive telemetry, and each of adjusting the power level at which the first specified bit is transmitted and adjusting the power level at which the second specified bit is transmitted comprises increasing or decreasing a charge time of an inductive coil of the first communication interface.

11. The method of claim 1, wherein the first communication interface and the second communication interface communicate through radio frequency telemetry, and each of adjusting the power level at which the first specified bit is transmitted and adjusting the power level at which the second specified bit is transmitted comprises one of: increasing or decreasing an amplitude of an amplitude modulation signal, increasing or decreasing an amplitude or a frequency of a frequency modulation signal, and increasing or decreasing an amplitude or a frequency of a phase modulation signal.

12. The first communication interface of claim 11, wherein the specified event that occurs when the minimum power is determined comprises one of the following: 1) an occurrence of a particular pattern in a set of minimum power detection outcomes obtained from the second communication interface, 2) an expiration of a minimum power determination time period, and 3) an occurrence of consecutive adjusted power levels that are within a threshold value of each other.

13. The method of claim 1, wherein one of the first communication interface and the second communication interface is an external device, and the other of the first communication interface and the second communication interface is an implantable device.

14. A first communication interface comprising:
a transceiver configured to receive signals from and transmit signals to a second communication interface; and
communication circuitry configured to:
  determine a minimum power of a transmit power range by adjusting a power level at which a first specified bit is transmitted from the first communication interface to the second communication interface, wherein the communication circuitry repeatedly adjusts the power level until a specified event occurs as a result of the repeated adjustments;
  determine a maximum power of the transmit power range by adjusting a power level at which a second specified bit is transmitted from the first communication interface to the second communication interface, wherein the communication circuitry repeatedly adjusts the power level until a specified event occurs as a result of the repeated adjustments; and
  set a transmit power level for signals to be transmitted from the first communication interface to the second communication interface to a preferred power level within the transmit power range.

15. The first communication interface of claim 14, wherein the communication circuitry adjusts the power level at which a first specified bit is transmitted by being configured to:
increase a present power level at which a present instance of the first specified bit was transmitted to obtain a next power level at which to transmit a next instance of the first specified bit, when a present detection outcome corresponds to a first outcome; and
decrease a present power level at which a present instance of the first specified bit was transmitted to obtain a next power level at which to transmit a next instance of the first specified bit, when the present detection outcome corresponds to a second outcome different from the first outcome.

16. The first communication interface of claim 15, wherein the first outcome corresponds to an error outcome which indicates that the value of the present instance of the first specified bit as decoded by the second communication interface does not match the value of the present instance of the first specified bit as transmitted by the first communication interface.

17. The first communication interface of claim 15, wherein the second outcome corresponds to a no error outcome which indicates that the value of the present instance of the first specified bit as decoded by the second communication interface does match the value of the present instance of the first specified bit as transmitted by the first communication interface.

18. The first communication interface of claim 14, wherein the first communication interface adjusts the power level at which a second specified bit is transmitted by being configured to:
decrease a present power level at which a present instance of the second specified bit was transmitted to obtain a next power level at which to transmit a next instance of the second specified bit, when a present detection outcome corresponds to a third outcome; and increase a present power level at which a present instance of the second specified bit was transmitted to obtain a next power level at which to transmit a next instance of the second specified bit, when the present detection outcome corresponds to a fourth outcome different from the third outcome.

19. The first communication interface of claim 18, wherein the third outcome corresponds to an error outcome which indicates that the value of a bit adjacent to and after the present instance of the second specified bit, as decoded by the second communication interface does not match the value of the adjacent bit as transmitted by the first communication interface.

20. The first communication interface of claim 18, wherein the fourth outcome corresponds to a no error outcome which indicates that the value of a bit adjacent to and after the present instance of the first specified bit, as decoded by the second communication interface does match the value of the adjacent bit as transmitted by the first communication interface.

21. The first communication interface of claim 14, wherein the specified event that occurs when the maximum power is determined comprises one of the following: 1) an occurrence of a particular pattern in a set of maximum power detection outcomes obtained from the second communication interface, 2) an expiration of a maximum power determination time period, and 3) an occurrence of consecutive adjusted power levels that are within a threshold value of each other.

22. The first communication interface of claim 14, further comprising an inductive coil coupled to the transceiver and configured to communicate with the second communication interface through inductive telemetry, wherein the communication circuitry adjusts the power level at which the first specified bit is transmitted and adjusts the power level at which the second specified bit is transmitted by being configured to increase or decrease a charge time of the inductive coil.

23. The first communication interface of claim 14, further comprising an antenna configured to communicate with the second communication interface communicate through radio frequency telemetry, wherein the communication circuitry adjusts the power level at which the first specified bit is transmitted and adjusts the power level at which the second specified bit is transmitted by being further configured to: increase or decrease an amplitude of an amplitude modulation signal, increase or decrease an amplitude or a frequency of a frequency modulation signal, or increase or decrease an amplitude or a frequency of a phase modulation signal.

24. A method of adjusting a transmit power level for signals to be transmitted from an external communication interface to an implantable communication interface, the method comprising:
determining each of a minimum transmit power level and a maximum transmit power level by intentionally causing signal reception errors to occur at the implantable communication interface, the minimum transmit power level and the maximum transmit power level defining the bounds of a range of power levels; and
selecting a preferred transmit power level from within the range of power levels, as a power level at which to transmit signals to the implantable communication interface.

25. The method of claim 24, further comprising determining the minimum transmit power level by:
decreasing a transmit power level of a particular bit of a bit pattern transmitted by the external communication interface until a reception error occurs at the implantable communication interface; and
increasing the transmit power level of the particular bit until a reception error does not occur at the implantable communication interface.

26. The method of claim 24, further comprising determining the maximum transmit power level by:
increasing a transmit power level of a particular bit of a bit pattern transmitted by the external communication interface until a reception error occurs at the implantable communication interface; and
decreasing the transmit power level of the particular bit until a reception error does not occur at the implantable communication interface.

27. An external communication interface comprising:
a transceiver configured to receive signals from and transmit signals to an implantable communication interface; and
communication circuitry configured to:
determine each of a minimum transmit power level and a maximum transmit power level by intentionally causing signal reception errors to occur at the implantable communication interface, the minimum transmit power level and the maximum transmit power level defining the bounds of a range of power levels; and
select a preferred transmit power level from within the range of power levels, as a power level at which to transmit signals to the implantable communication interface.

28. The external communication interface of claim 27, wherein the communication circuitry is further configured to determine the minimum transmit power level by:
decreasing a transmit power level of a particular bit of a bit pattern transmitted by the external communication interface until a reception error occurs at the implantable communication interface; and
increasing the transmit power level of the particular bit until a reception error does not occur at the implantable communication interface.

29. The external communication interface of claim 27, wherein the communication circuitry is further configured to determine the maximum transmit power level by:
increasing a transmit power level of a particular bit of a bit pattern transmitted by the external communication interface until a reception error occurs at the implantable communication interface; and
decreasing the transmit power level of the particular bit until a reception error does not occur at the implantable communication interface.

* * * * *